(12) United States Patent
Weitzel

(10) Patent No.: US 10,239,096 B2
(45) Date of Patent: Mar. 26, 2019

(54) BASE PLATE ASSEMBLY TRANSFER MECHANISM AND METHODS

(71) Applicant: Thomas Weitzel, Overton, NE (US)

(72) Inventor: Thomas Weitzel, Overton, NE (US)

(73) Assignee: Baldwin Filters, Inc., Kearney, NE (US)

( * ) Notice: Subject to any disclaimer, the term of this patent is extended or adjusted under 35 U.S.C. 154(b) by 494 days.

(21) Appl. No.: 14/995,007

(22) Filed: Jan. 13, 2016

(65) Prior Publication Data

US 2016/0199979 A1 Jul. 14, 2016

Related U.S. Application Data

(60) Provisional application No. 62/103,434, filed on Jan. 14, 2015.

(51) Int. Cl.
  *B25J 9/00* (2006.01)
  *B08B 3/04* (2006.01)
  *B01D 27/00* (2006.01)

(52) U.S. Cl.
  CPC ............ *B08B 3/041* (2013.01); *B01D 27/005* (2013.01)

(58) Field of Classification Search
  CPC . B08B 3/022; B08B 3/41; B08B 3/123; B25J 9/042; B25J 9/0093; B25J 15/08; B21D 43/04; B21D 43/105; B01D 27/005; B65G 47/90; B25B 11/00; B25B 11/002; B25B 11/005
  USPC .......................................... 134/25.4, 124, 61
  See application file for complete search history.

(56) References Cited

U.S. PATENT DOCUMENTS

| | | | |
|---|---|---|---|
| 3,633,766 A | 1/1972 | Byam | |
| 4,676,261 A | 6/1987 | Blaul | |
| 4,739,782 A | 4/1988 | Nourie | |
| 4,921,395 A | 5/1990 | Sahlin | |
| 5,143,102 A | 9/1992 | Blaul | |
| 5,492,443 A | 2/1996 | Crorey et al. | |
| 7,520,288 B2 | 4/2009 | Rhodes | |
| 8,763,619 B2 | 7/2014 | Lele et al. | |
| 2007/0267795 A1* | 11/2007 | Patwardhan | B23Q 3/06 269/37 |

* cited by examiner

*Primary Examiner* — Michael E Barr
*Assistant Examiner* — Tinsae B Ayalew
(74) *Attorney, Agent, or Firm* — Reinhart Boerner Van Deuren P.C.

(57) ABSTRACT

This invention relates to an apparatus for processing a baseplate assembly and more specifically to a transfer mechanism and a parts washer for processing baseplate assemblies. The transfer mechanism has a pivot arm that is mounted to a transfer and/or lift mechanism. The pivot arm holds a carrier unit having an abutment plate and a finger. The finger having an extended state and a retracted state relative to the abutment plate. The finger engaging and securing the baseplate assemblies to the carrier unit during the transport of the baseplate assemblies from a welder or tapper to a parts washer. The transfer mechanism picks the baseplate assemblies from the welder or tapper in a horizontally extending alignment and deposits the baseplate assembly in the parts washer in a vertically extending alignment. The parts washer then washes the baseplate assemblies, while the baseplate assemblies remain in a vertically extending alignment.

29 Claims, 17 Drawing Sheets

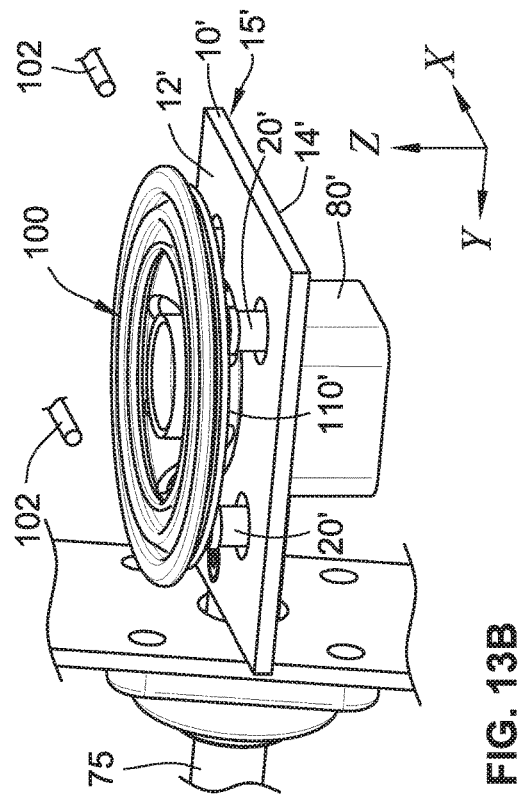
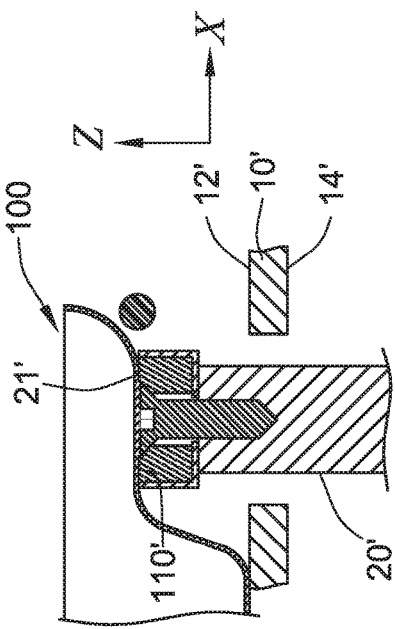
FIG. 13A
FIG. 14A
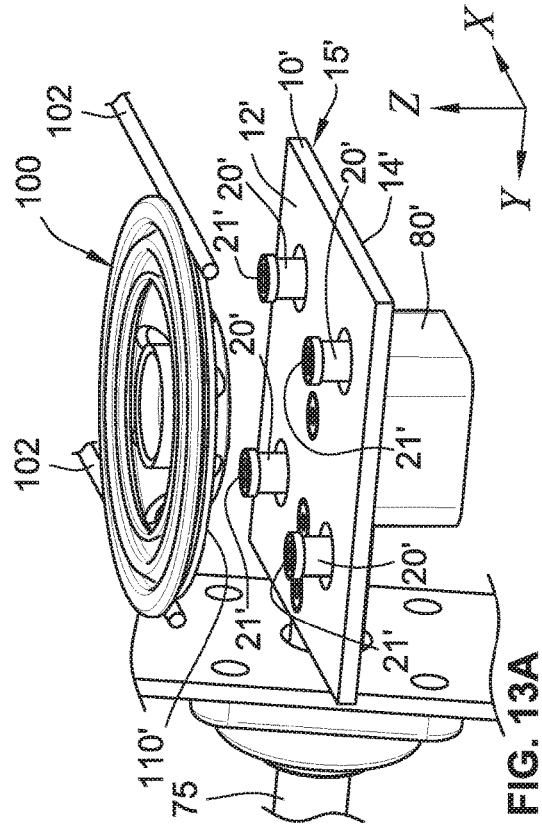
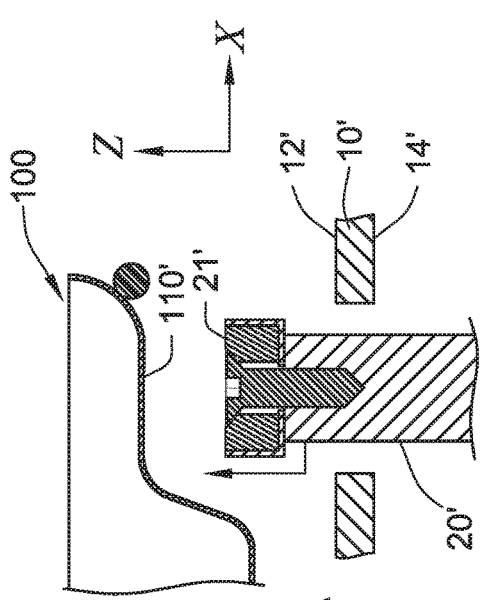
FIG. 13B
FIG. 14B

BASE PLATE ASSEMBLY TRANSFER MECHANISM AND METHODS

CROSS-REFERENCE TO RELATED PATENT APPLICATIONS

This patent application claims the benefit of U.S. Provisional Patent Application No. 62/103,434, filed Jan. 14, 2015, the entire teachings and disclosure of which are incorporated herein by reference thereto.

FIELD OF THE INVENTION

This invention generally relates to an apparatus for processing a baseplate assembly and more specifically to a transfer mechanism for transferring baseplate assemblies to a parts washer and a parts washer for washing baseplate assemblies.

BACKGROUND OF THE INVENTION

At the present time, industry has automated many metalworking and assembly operations whereby a series of operations may be carried out on a workpiece through an automated process. In order to carry out such a series of operations, it is necessary to have transfer devices or mechanisms to transfer and handle workpieces between machining stations such as pressing machines, drilling machines, milling machines, and the like.

Such transfer devices or mechanisms are known, for example, U.S. Pat. No. 3,633,766 to Byam et al.; U.S. Pat. No. 4,921,395 to Sahlin and U.S. Pat. No. 5,492,443 to Crorey et al., the entire disclosures of which are hereby incorporated by reference.

In the field of baseplate assemblies, each baseplate assembly is typically run through a parts washer to remove contaminants or debris, such as dirt, grime, carbon, oil, grease, metal chips, cutting fluids, mold release agents, ink, paint, and corrosion from workpieces. Most parts washers are designed to clean, de-grease and dry bulky loads of small or large parts in preparation for assembly, inspection, surface treatment, packaging and distribution. Parts washers may be as simple as the manual "sink-on-a-drum" common to many auto repair shops, or they may be very complex, multistage units with pass-through parts handling systems.

Such prior parts washers are known, for example, as exemplified in U.S. Pat. No. 4,739,782 A to Nourie; U.S. Pat. No. 5,143,102 A to Blaul; U.S. Pat. No. 4,676,261 A to Blaul; U.S. Pat. No. 8,763,619 B2 to Lele et al; U.S. Pat. No. 7,520,288 B2 to Rhodes, the entire disclosure of which are hereby incorporated by reference in their entireties.

The present invention is directed towards improvements over the state of the art as it relates to the above-described features and other features of filter baseplate assembly transfer apparatus.

BRIEF SUMMARY OF THE INVENTION

A first inventive aspect of the present invention is directed to a carrier unit that is rotatable between a horizontally extending alignment and a vertically extending alignment. The carrier unit has a finger that when in an extended state relative to an abutment plate can hold a baseplate assembly on the carrier unit in a horizontally extending alignment or a vertically extending alignment. The finger also has a retracted state relative to the abutment plate to release the baseplate assembly from the abutment plate.

The pivot arm can also receive baseplate assemblies in a horizontally extending position from a welding or tapping station and deposit the baseplate assemblies into a parts washer.

In certain embodiments, the parts washer may include a lane defined by a first and a second sidewall. The first and second sidewall define a slot that has a horizontal width that is greater than the axial thickness of the baseplate assembly, such that the baseplate assembly can be maintained in the slot in a vertically extending alignment while the diameter of the baseplate assembly is vertically extending.

In certain other embodiments, the parts washer can have a conveyor extending longitudinally from an inlet area to an outlet area of the parts washer. The parts washer may also include a lane extending longitudinally from the inlet area to the outlet area of the parts washer. The conveyor may have a catch extending vertically from the conveyor. The catch can engage and drive baseplate assemblies down the lane of the parts washer while the first and second sidewall of the lane keep the baseplate assemblies in a vertically extending alignment.

The baseplate assemblies may include a plurality of apertures that provide an inlet port and an outlet port through the baseplate assembly, which include a thread opening and a plurality of apertures that surround the thread opening. In certain embodiments, a finger that has a retracted state and an extended state relative to an abutment plate can secure the baseplate assembly while the baseplate assembly is in a vertically extending or a horizontally extending alignment by projecting through the thread opening of the baseplate assembly.

The transfer mechanism may also include a pivot arm to carry the abutment plate. The transfer mechanism may also include a transfer and/or lift mechanism capable of providing the pivot arm with vertical and/or linear movement. The pivot arm may mount to the spindle of the transfer and/or lift mechanism.

Another feature of the transfer mechanism is that it may have a first linear drive unit coupled to a rocker arm assembly. The rocker arm assembly may have a push rod mechanically coupled to a rocker, which is coupled to a shaft. The shaft can be coupled to an abutment plate, whereby movement of the first linear drive unit is operative to rotate the abutment plate.

In certain embodiments, the transfer mechanism may also include a second linear drive unit mounted to the abutment plate that can drive a retractable finger between an extended state and retracted state relative to the abutment plate.

In certain embodiments and other inventive aspects, the apparatus may have a parts washer. The parts washer can have an inlet area and an outlet area. The parts washer can have a conveyor that extends between the inlet area and the outlet area. The conveyor may also contain a catch extending vertically from the conveyor. The parts washer may have one or more lanes to receive and guide the baseplate assemblies. The lane may have a ramp that receives and retains the baseplate assemblies in a vertically extending alignment. The lane may also have a first and second sidewall defining a slot that is longitudinally extending from the ramp of the inlet area to the outlet area of the parts washer. The slot has a width defined by the first and second sidewall that may be greater than the axial thickness of the baseplate assembly, such that the baseplate assembly is maintained in the slot of the lane in a vertically extending alignment.

Another inventive aspect is directed towards the first and second sidewall of the lane. The first and second sidewall may be moveable relative to one another to adjust the horizontal width of the slot. This allows the first and second sidewall to adjust the width of the slot to facilitate baseplate assemblies of varying axial thickness. Thereby, allowing the slot to guide baseplate assemblies having varying axial thicknesses along the conveyor of the parts washer in a vertically extending alignment.

In certain embodiments, there may be a multitude of catches vertically extending from the conveyor to engage and drive a multitude of baseplate assemblies along the conveyor in a vertically extending alignment.

Another inventive aspect is directed towards a method of transferring a baseplate assembly from a welding or tapping station to a parts washer. The baseplate assembly may be received in a horizontally extending position by a carrier unit. The carrier unit having a finger that can be extended to an extended state relative to an abutment plate. The baseplate assembly, secured by the finger, can then be transferred by the transfer and/or lift mechanism from the welder or tapper to the parts washer. At the parts washer the carrier unit may rotate between a horizontally extending alignment and a vertically extending alignment. The baseplate assembly can be retained on the carrier unit by the finger in its extended state while the baseplate assembly and the carrier unit rotate to a vertically extending alignment. The baseplate assembly can be released from the carrier unit by moving the finger from the extended state to a retracted state, thereby allowing the baseplate assembly to drop into the parts washer.

Another inventive aspect of the method relates to guiding the baseplate assembly down a ramp of a parts washer and into the slot of a lane on the conveyor while maintaining the baseplate assembly in a vertically extending alignment by the sidewalls of the ramp portion of the lane. The horizontal width of the slot is defined by the sidewalls and the horizontal width of the slot may be greater than the axial thickness of the baseplate assembly. Thereby, allowing the baseplate assembly to maintain a vertically extending alignment while in the slot of the lane when the diameter of the baseplate assembly is extending vertically.

In certain embodiments, the method may comprise powering and driving a conveyor with a conveyor drive unit. A catch can extend vertically from the conveyor to engage and drive the baseplate assemblies in a linear direction along the conveyor, while the first and second sidewall of the lane guides the baseplate assemblies along the conveyor in a vertically extending alignment.

Another inventive aspect is directed towards washing the baseplate assemblies as the baseplate assemblies are driven along the conveyor in a vertically extending alignment.

In another embodiment the apparatus for processing a filter element baseplate assembly, comprising a transfer mechanism comprising a carrier unit rotatable between a horizontally extending alignment and a vertically extending alignment. The carrier unit has a finger and an abutment plate with the finger having an extended state relative to the abutment plate. The finger has a contact surface that secures the filter element baseplate assembly to the carrier unit in each of the horizontally and vertically extending alignments. The finger also has a retracted state relative to the abutment plate that releases the filter element baseplate assembly from the carrier unit.

According to another aspect the transfer mechanism can pick the filter element baseplate assembly from a welder or tapper in the horizontal position and deposits the filter element base plate assembly in a parts washer.

Another inventive aspect of the apparatus is that the parts washer includes a lane defined by a first and a second sidewall with the first and second sidewall defining a slot. The slot having a horizontal width that is greater than the axial thickness of the filter element baseplate assembly such that the filter element baseplate assembly is maintained in the slot in a vertically extending alignment where the diameter of the filter element baseplate assembly is vertically extending According to another inventive aspect the parts washer can have a conveyor extending longitudinally from an inlet to an outlet of the parts washer. The lane extending longitudinally along the parts washer and having a slot and a first and a second sidewall. The conveyor of the parts washer may also have a catch that extends vertically from the conveyor. The catch capable of engaging and driving the filter element baseplate assemblies along the lane of the parts washer, while the filter element baseplate assemblies remain in a vertically extending alignment.

According to another inventive aspect of the application the contact surface of the finger can be a magnet, a pneumatic vacuum, or an adhesive.

According to yet still another inventive aspect of the present application the transfer mechanism can have a pivot arm carrying for carrying the carrier unit with the pivot arm mounted to a work transfer and/or lift mechanism.

Yet still another inventive aspect of the present application is a first linear drive unit that is coupled to a pushrod, with the pushrod coupled to a rocker, the rocker coupled to a shaft and the shaft is coupled to the carrier unit where the movement of the first linear drive unit is operative to rotate the carrier unit.

According to yet another inventive aspect of the present application the apparatus can have a second linear drive unit. The second linear drive unit can have a rod mechanically coupled to the abutment plate that when actuated moves the finger from the extended state to the retracted state.

According to another inventive aspect of the present application a method of using the apparatus can include positioning a carrier unit in a horizontally extending alignment. Then receiving a filter element baseplate assembly on a contact surface of a finger of the carrier while the finger is in an extended state relative to an abutment plate. Then transferring the filter element baseplate assembly on the carrier unit from a welder or tapper to a parts washer while the contact surface of the finger secures the filter element baseplate assembly to the carrier unit. Then rotating the carrier unit and the filter element baseplate assembly between the horizontally extending alignment and a vertically extending alignment while retaining the filter element baseplate assembly on the carrier unit in the vertically extending alignment with the contact surface of the finger. Finally, retracting the finger to a retracted state relative to the abutment plate to release the filter element baseplate assembly from the carrier unit where the filter element baseplate assembly drops into a lane of the parts washer.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 9 B is an exemplary illustration of the carrier unit, abutment plate, and finger in a horizontally extending alignment with the finger in a retracted state relative to the abutment plate holding a baseplate assembly.

FIG. 9 C is an exemplary illustration of a carrier unit, abutment plate, and finger in a vertically extending alignment according to an aspect of the invention with the finger in an extended state relative to the abutment plate and projecting through the thread opening of a baseplate assembly.

FIG. 9 D is an exemplary illustration of the carrier unit, abutment plate, and finger in a vertically extending alignment according to an aspect of the invention with the finger in a retracted state relative to the abutment plate releasing a baseplate assembly from the carrier unit.

FIG. 13 B is an exemplary illustration of a carrier unit, abutment plate, and fingers in a horizontally extending alignment with the fingers in an extended state relative to the abutment plate and the finger holding a baseplate assembly to the carrier unit.

FIG. 13 C is an exemplary illustration of a carrier unit, abutment plate, and fingers in a vertically extending alignment with the fingers in an extended state relative to the abutment plate where the finger is holding a baseplate assembly to the carrier unit in a vertically extending alignment.

FIG. 13 D is an exemplary illustration of a carrier unit, abutment plate, and fingers in a vertically extending alignment with the fingers in a retracted state relative to the abutment plate and the baseplate assembly having been released from the carrier unit in a vertically extending alignment.

FIG. 14 B is a partial close up cross-sectional view of a baseplate assembly and carrier unit after the baseplate assembly has been engaged and secured by a finger of the carrier unit while the baseplate assembly and the carrier unit are in a horizontally extending alignment.

FIG. 14 C is partial close up cross-sectional view of a baseplate assembly and carrier unit after the baseplate assembly has been engaged and secured by a finger of the carrier unit where the baseplate assembly and carrier unit are in a vertically extending alignment.

FIG. 14 D is partial close up cross-sectional view of a baseplate assembly and carrier unit further illustrating the baseplate assembly making contact with an abutment plate thereby releasing the baseplate assembly from the carrier unit while in a vertically extending alignment.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 10:
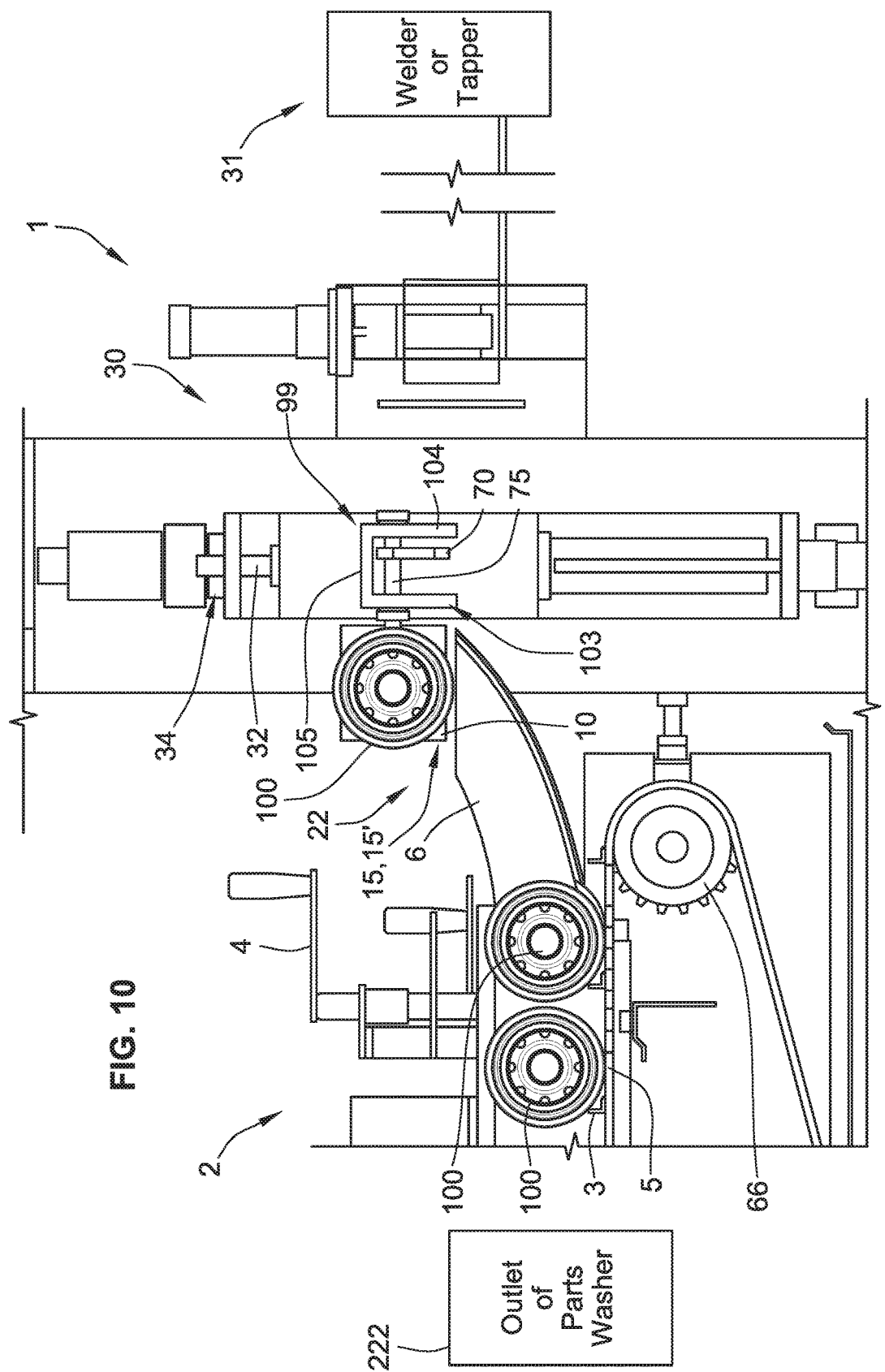
FIG. 10 is a partially schematic exemplary illustration of the apparatus for processing a baseplate assembly according to an aspect of the invention showing an exemplary welder or tapper, transfer mechanism, and parts washer.
Figure 11:
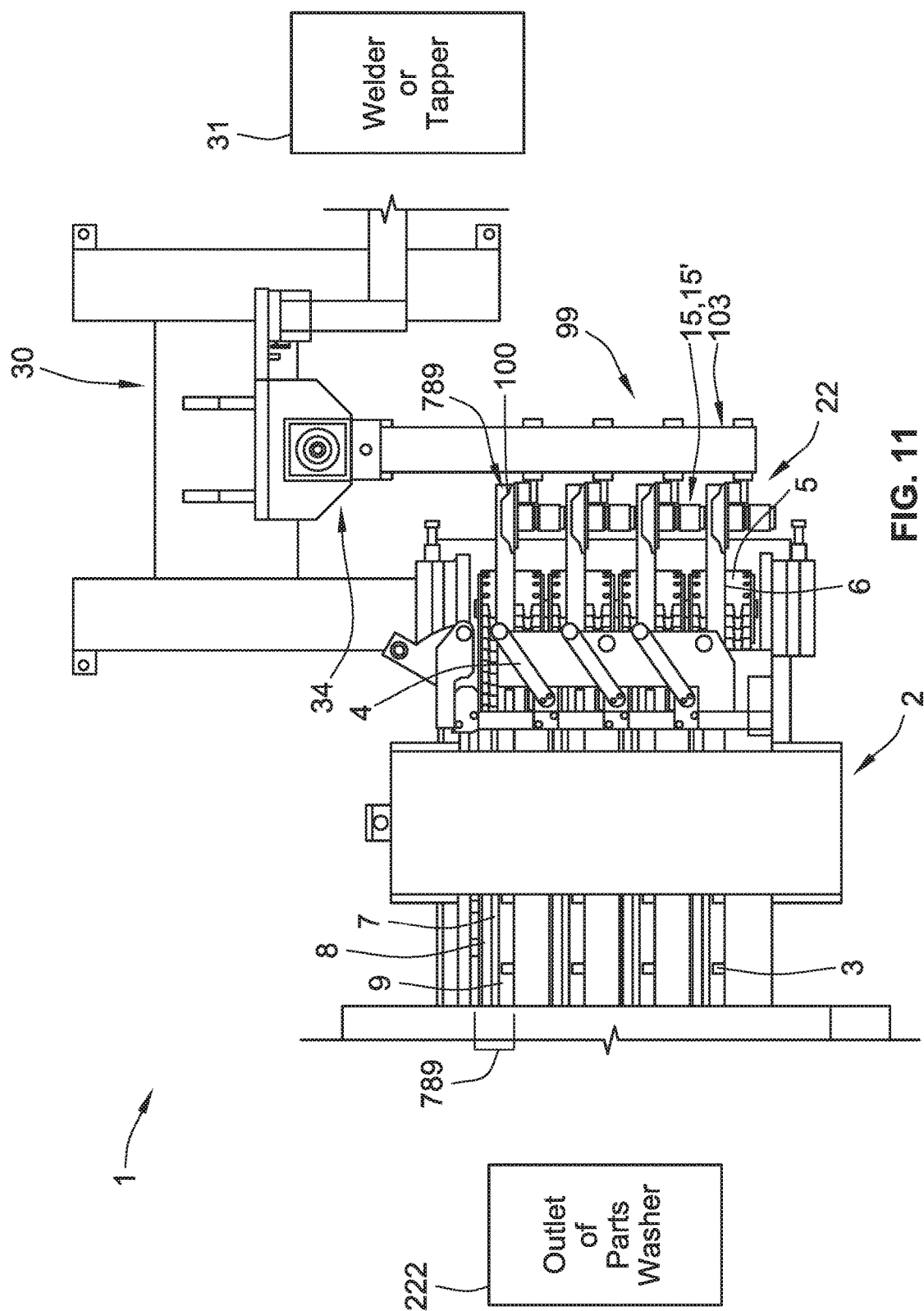
FIG. 11 is an exemplary illustration of a top down perspective view of an apparatus for processing baseplate assemblies according to an aspect of this invention including an exemplary welder or tapper, transfer mechanism, and parts washer.

Referring to the Figures, wherein like numerals indicate like or corresponding parts throughout the several views. As best shown in FIGS. 10 and 11 a filter element baseplate assembly transfer apparatus 1 (herein "transfer apparatus")

having a filter element baseplate assembly transfer mechanism 30 (herein "transfer mechanism") for transporting filter element baseplate assemblies 100 (herein "baseplate assembly" or "baseplate assemblies") from a filter element baseplate assembly welder or tapper station (herein "welder or tapper"), as generally shown at 31, to a filter element baseplate assembly parts washer (herein "parts washer"), as generally shown at 2. The welder or tapper 31 consists of a welder of the kind generally known in the field of baseplate assemblies or a tapper of the kind generally known in the field of baseplate assemblies. Typically, in the field of baseplates assemblies, a tapper will "tap" a central thread opening in a baseplate and a welder will weld a baseplate to a seaming lid to form a baseplate assembly.

As best illustrated in FIG. 9 C, a typical baseplate assembly 100 has a baseplate 93, which can be made of stamped sheet metal or any other suitable material known in the field of baseplate assemblies. The baseplate 93 has a thread opening 101 and a multitude of peripheral apertures 102 surrounding the thread opening 101, as illustrated in FIG. 9 C. Typically, the thread opening 101 is "taped" into the baseplate 93 by a tapper 31, as generally illustrated in FIGS. 10-11. One of ordinary skill in the art will appreciate that the tapper 31 may be of any type generally known in the art. The baseplate assembly 100 also has a seaming lid 94, as best illustrated in FIG. 9 C. The seaming lid 94 can be manufactured from sheet metal or any other suitable material known in the field of baseplate assemblies. Typically, a welder, as generally indicated at 31 in FIG. 10-11, mechanically couples the baseplate 93 and the seaming lid 94. However, as would be appreciated by one of ordinary skill in the art the baseplate 93 and the seaming lid 94 can be coupled by any number of means generally known in the art.

Figure 1:
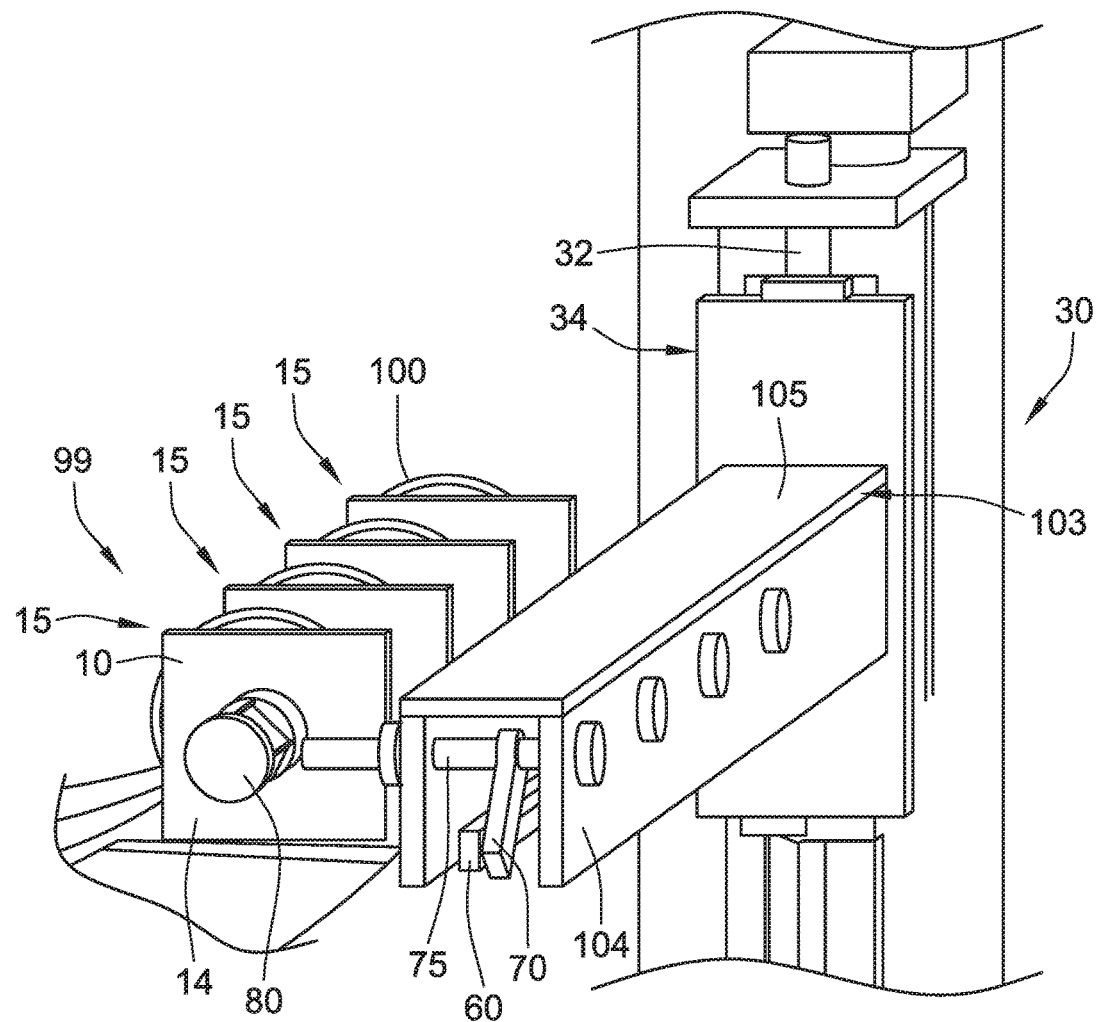
FIG. 1 is a partial perspective view of a transfer mechanism according to an aspect of the invention for transporting baseplate assemblies from a welder or tapper to a parts washer, as shown in an exemplary application.
Figure 9A:
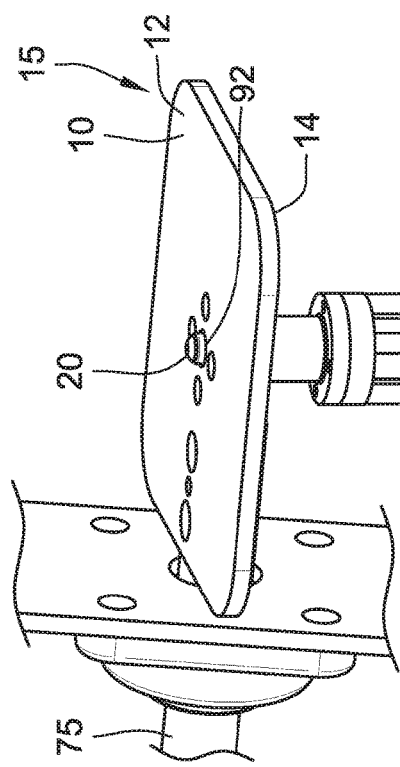
FIG. 9 A is an exemplary illustration of the carrier unit, abutment plate, and finger in a horizontally extending alignment according to an aspect of the invention with the finger in a retracted state relative to the abutment plate.
Figure 9B:
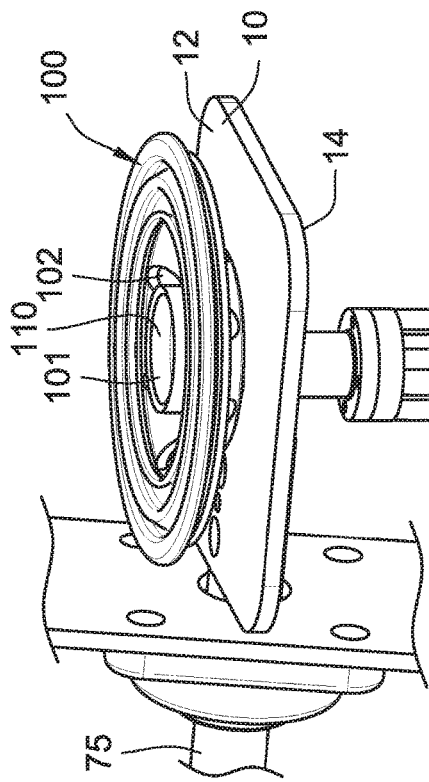
Figure 9C:
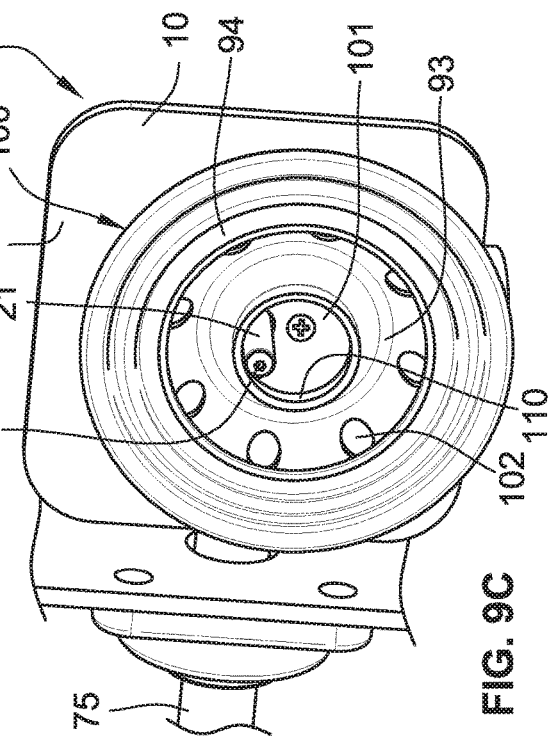
Figure 9D:
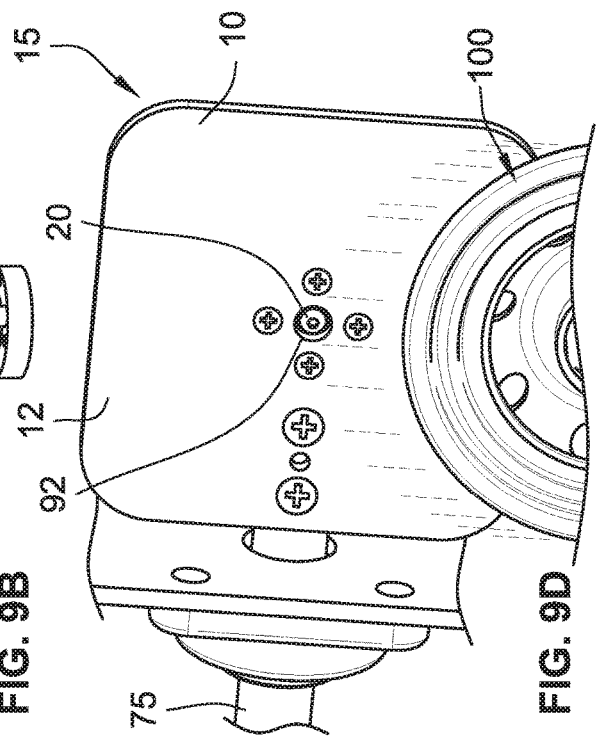

The transfer mechanism 30, as partially illustrated in FIG. 1, can have a pivot arm 99 that mounts to a transfer and/or lift mechanism 34. As best illustrated in FIGS. 9A and 13A, the pivot arm 99 holds carrier unit 15 comprising an abutment plate 10 having at least one aperture 92 and at least one finger 20 that can project through aperture 92.

Figure 13C:
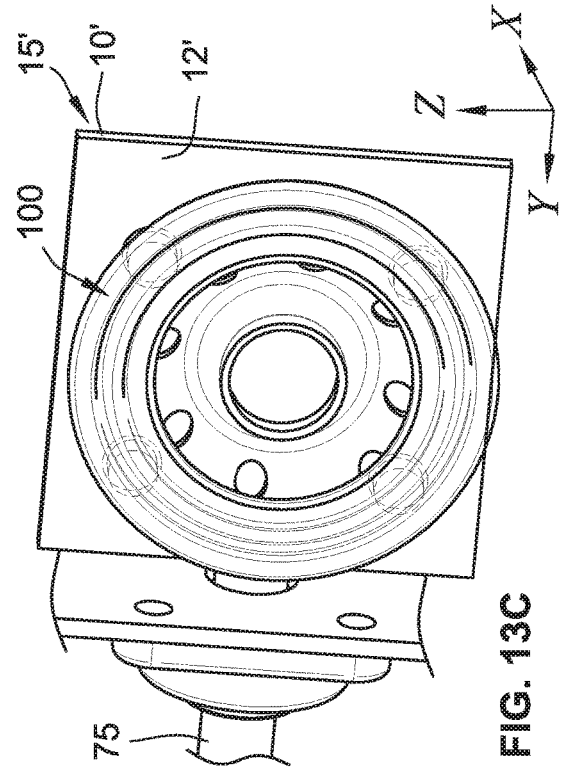
FIG. 13 A is an exemplary illustration of a carrier unit, abutment plate, and fingers in a horizontally extending alignment with the finger in an extended state relative to the abutment plate with a baseplate assembly above the carrier unit.
Figure 13D:
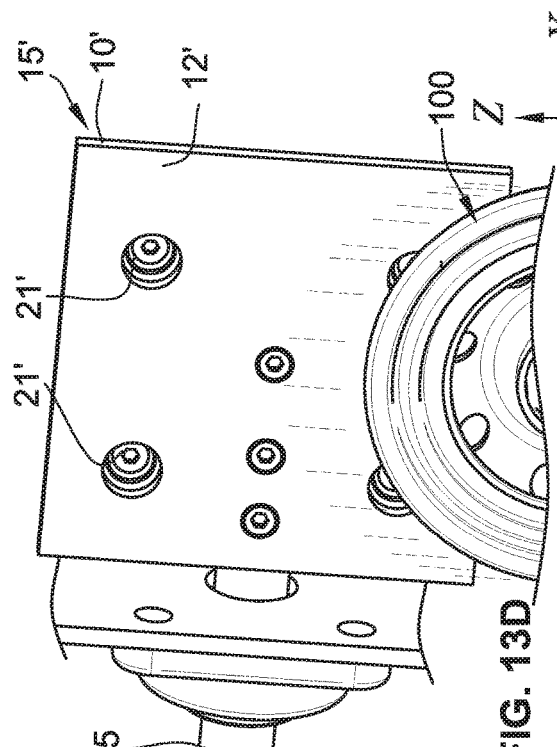

According to one aspect of the present application the finger 20 has an extended state (see FIG. 9 C and FIG. 13 A) relative to the abutment plate 10 and a retracted state relative to the abutment plate 10 (see FIG. 9 A and FIG. 13 D). The finger 20 enters the extended state and the retracted state by the movement of the finger 20 in a linear direction relative to the abutment plate 10.

Figure 2:
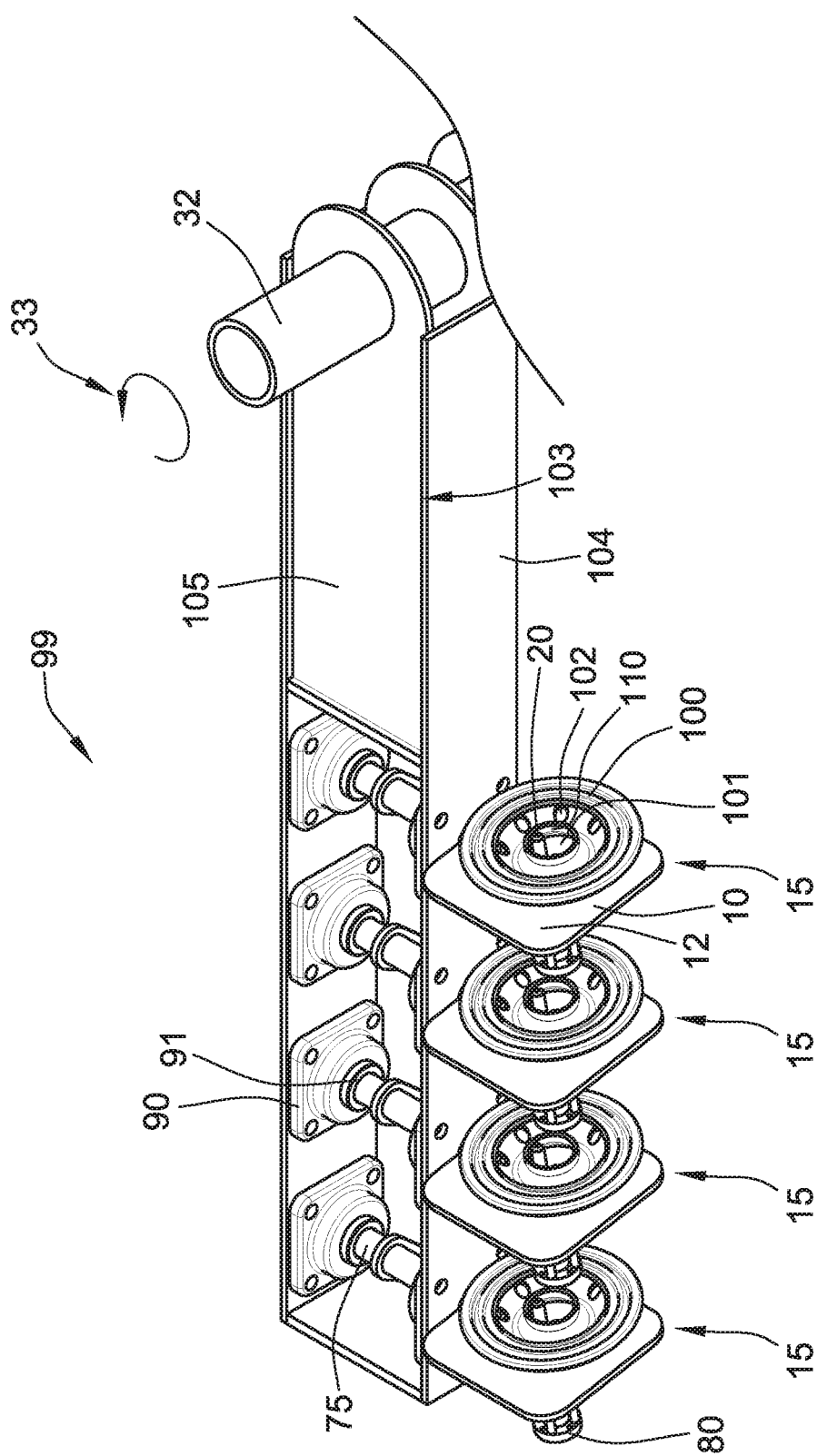
FIG. 2 illustrates a front partial perspective elevation view of the pivot arm according to an aspect of the invention with the carrier unit, abutment plate, and finger in a vertically extending alignment.
Figure 3:
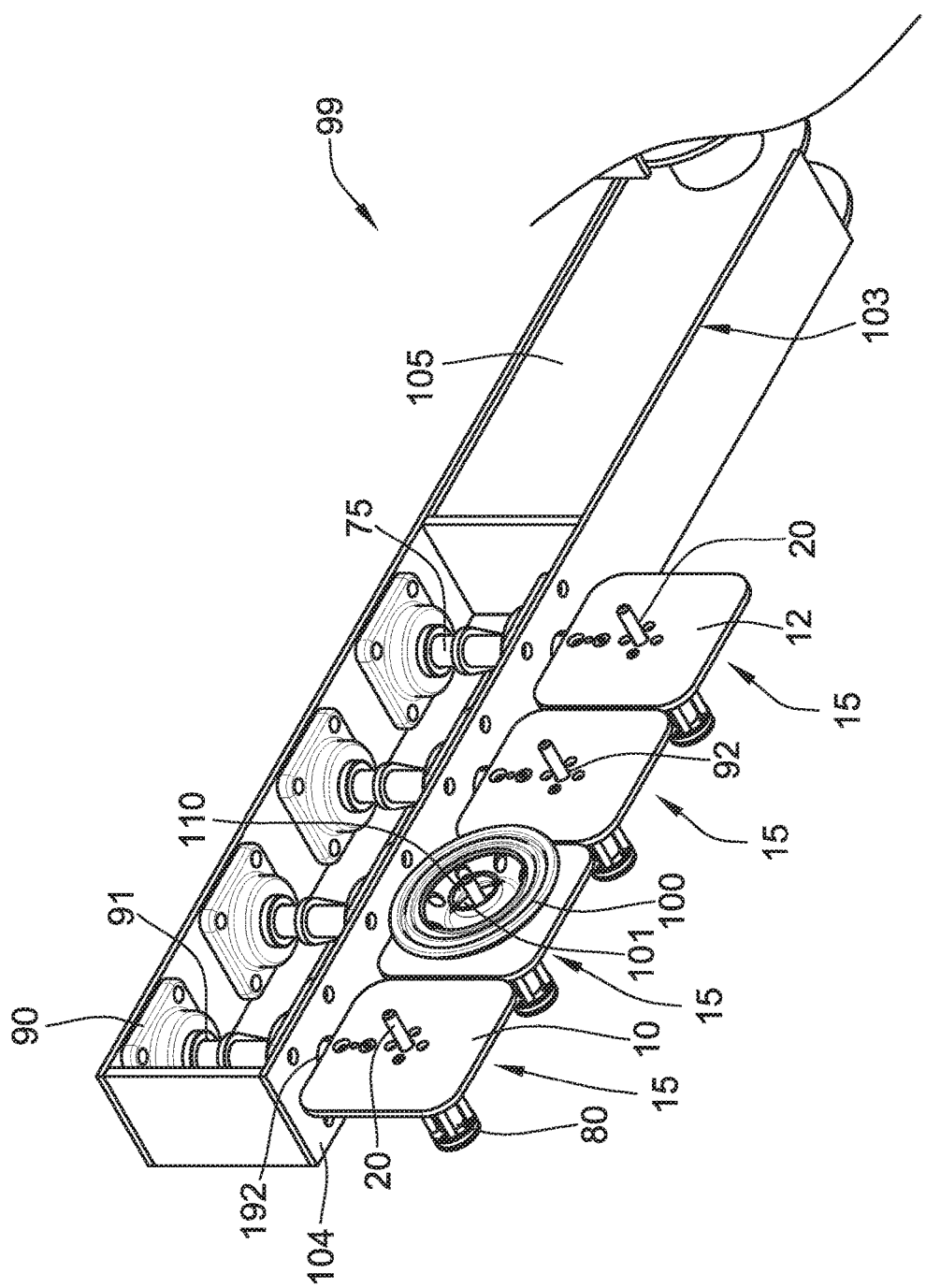
FIG. 3 illustrates a front partial perspective elevated view of the pivot arm according to an aspect of the invention with the carrier unit, abutment plate, and finger in a horizontally extending alignment.

As illustrated in FIG. 2-3, the pivot arm 99 can have a generally rectangular tubular frame 103 that is coaxially arranged around a horizontal top plate 105. A rectangular skirt 104 depends from the outer periphery of the top plate 105.

Figure 4:
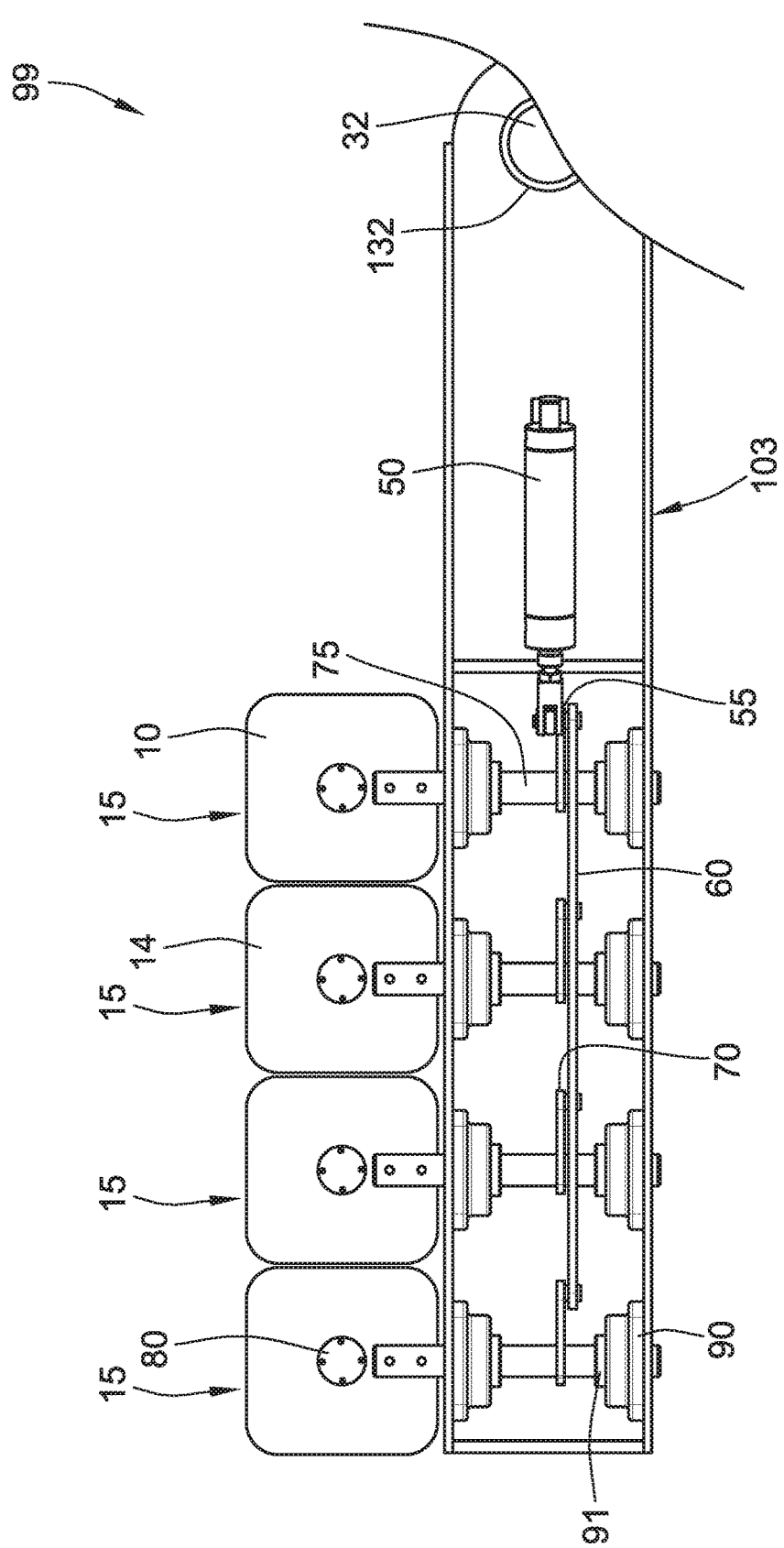
FIG. 4 illustrates a bottom-up partial perspective view of the pivot arm according to an aspect of the invention with the carrier unit, abutment plate, and finger in a horizontally extending alignment.
Figure 5:
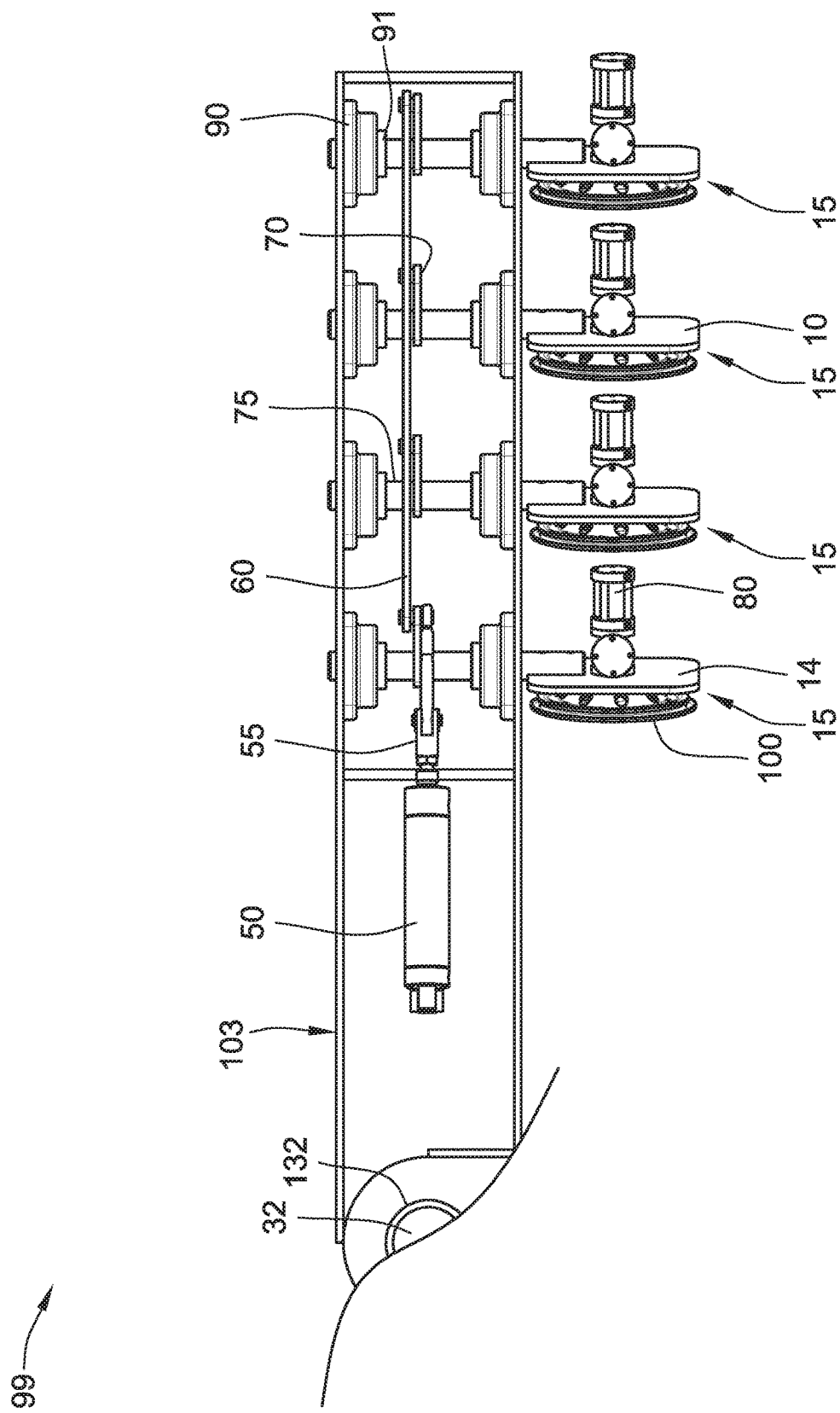
FIG. 5 illustrates a bottom-up partial perspective view of the pivot arm according to an aspect of the invention with the carrier unit, abutment plate, and finger in a vertically extending alignment.
Figure 6:
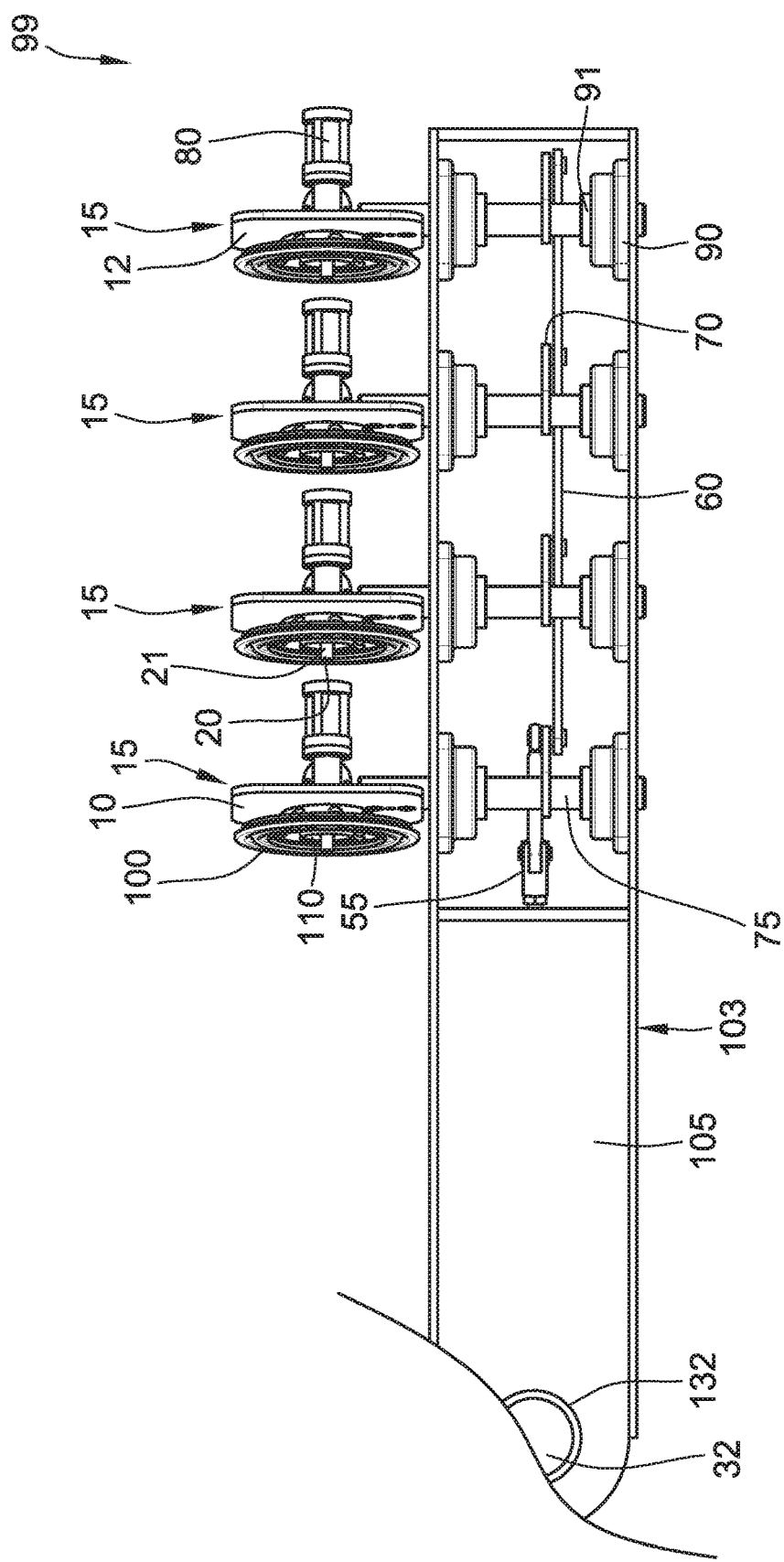
FIG. 6 illustrates a top-down partial perspective view of the pivot arm according to an aspect of the invention with the carrier unit, abutment plate, and finger in a vertically extending position with the finger in an extended state relative to the abutment plate and securing a multitude of baseplate assemblies to the carrier units.
Figure 7:
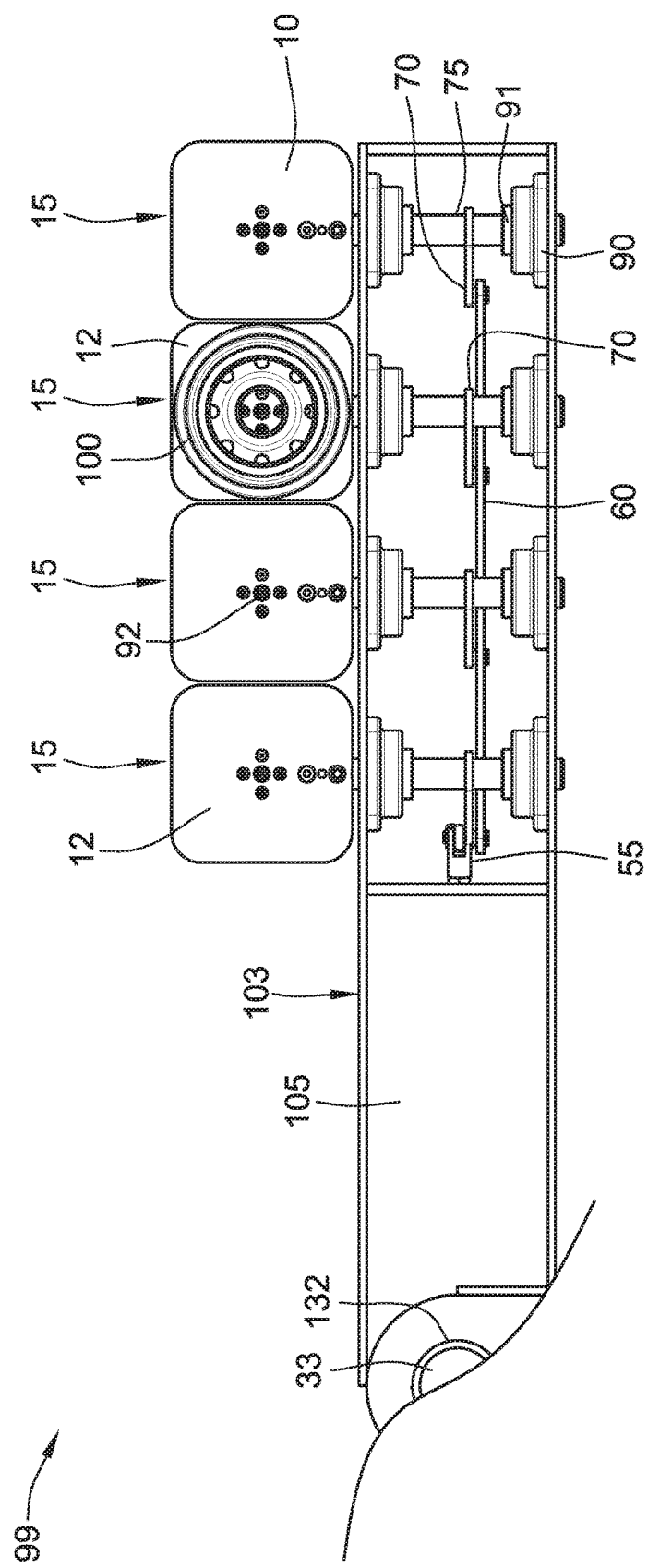
FIG. 7 illustrates a top-down partial perspective view of the pivot arm according to an aspect of the invention with the carrier unit, abutment plate, and finger in a vertically extending alignment holding a baseplate assembly.

Turning to FIGS. 4-5, the frame 103 can house a rocker arm assembly. The rocker arm assembly can have a first linear drive unit 50, which is mechanically coupled to the pushrod 60, which is mechanically coupled to the rockers 70, which is mechanically coupled to the shafts 75. The shafts 75 are supported by bearing supports 90 and bearings 91, which allow the shafts 75 to rotate while also prohibiting angular movement of the shafts 75, as illustrated in FIGS. 4-7.

Each shaft 75 extends through a corresponding aperture 192 in the rectangular skirt 104 and is mechanically coupled to a corresponding carrier unit 15, as best illustrated in FIG. 3. The abutment plate 10 has a first surface 12, as illustrated in FIG. 3, and a second surface, as illustrated in FIG. 4. 14.

According to one embodiment of the present application, a second linear drive unit 80 can be mechanically coupled to the second surface 14 of the abutment plate 10, as best illustrated in FIGS. 4-5. In the embodiment illustrated in FIGS. 4-5 the second linear drive unit 80 houses the finger 20 that enters the extended state and retracted state by passing through aperture 92 of the abutment plate 10.

Figure 8:
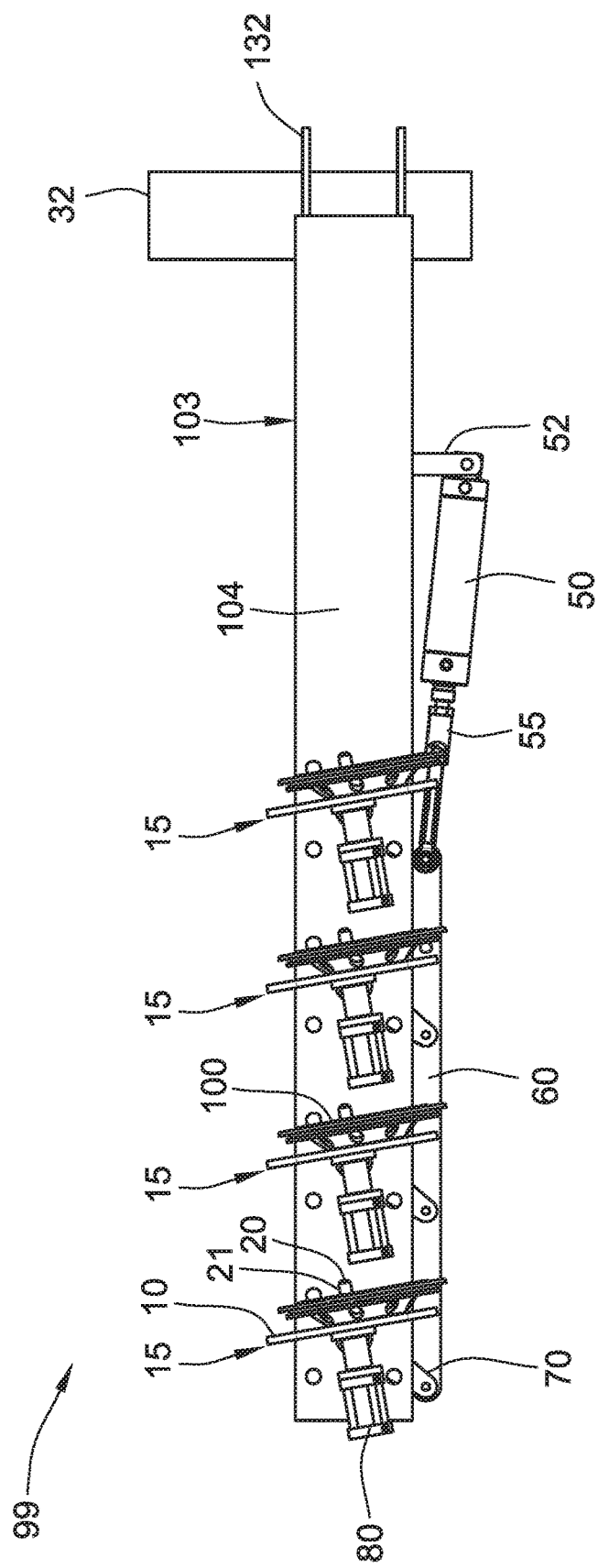
FIG. 8 illustrates a partial side view of the pivot arm according to an aspect of the invention of FIG. 6.

Additionally, the pivot arm 99 has a bracket 132 that can mount to a spindle 32, as best illustrated in FIG. 8. As illustrated in FIG. 10, the pivot arm 99 can mount to a transfer and/or lift mechanism 34, which allows the pivot arm 99 to move in a vertical and/or linear direction.

FIGS. 10-11, showing one embodiment according to one aspect of the present application in a typical application whereby the baseplate assemblies 100 are loaded on the abutment plate 10 at the welder or tapper 31 and then transported by the transfer mechanism 30 to the parts washer 2 for unloading. As seen in FIG. 2, the spindle 32 of the transfer and/or lift mechanism 34 can serve as an axis 33 of the transfer mechanism 30 in which the pivot arm 99 may rotate. In addition to moving the pivot arm 99 in a linear direction around the spindle 32 the transfer and/or lift mechanism 34 can move the pivot arm 99 in a vertical direction, which provides a greater range of linear motion and the ability to lift and/or lower the baseplate assemblies 100 as desired. For example, the transfer and/or lift mechanism 34 may change the elevation of the baseplate assemblies 100 between the welder or tapper 31 and the parts washer 2.

Turning to FIGS. 2-8, illustrating one embodiment of the arm 99 and carrier units 15, the first linear drive unit 50 can provide linear reciprocating motion, which can be transferred to the pushrod 60. The pushrod 60 can transfer the reciprocating linear motion to the first, second, third, and fourth rockers 70. The rockers 70 can then transfer the reciprocating linear motion into oscillating motion, which is applied to the first, second, third and a fourth shafts 75. The shafts 75 project through aperture 192 in the skirt 104 of the frame 103 and mechanically attach to corresponding first, second, third fourth abutment plates 10 of the respective carrier units 15.

As the first linear drive unit 50 is actuated it provides reciprocating linear motion to the shafts 75, which cause the shafts 75 to oscillate, which in turn rotates the carrier unit 15 including the abutment plates 10 and fingers 20 90° from a horizontally extending alignment, as illustrated in FIG. 9 A, to a vertically extending alignment, as illustrated in FIG. 9 D. Herein, the term "horizontally extending" is to mean primarily horizontal at an angle up to or equal to 45° and the term "vertically extending" is to mean primarily vertical at an angle greater than or equal to 45°.

According to one embodiment of the present application when the carrier unit 15 is in a horizontally extending alignment, the finger 20 is typically in a retracted state and ready to engage the baseplate assembly 100, as illustrated in FIG. 9 A. With the baseplate assembly 100 resting on the abutment plate 10, as illustrated in FIG. 9 B, the second linear drive unit 80 can actuate the finger 20 into its extended state. In the illustrated embodiment the finger 20 projects through the aperture 92 of the abutment plate 10 and through the thread opening 101 of the filter element baseplate 100. The contact surface 21 of the finger 20 can then make contact with and secure the filter element baseplate 100 to the carrier unit 15 in either the horizontally extending alignment or the vertically extending alignment, as illustrated in FIG. 9 C. The second linear drive unit 80 can release the finger 20 from its extended state and return to its retracted state through aperture 92 of the abutment plate 10. As the finger 20 returns to its retracted state the contact surface 21 of the finger 20 also travels through the thread opening 101 of the filter element baseplate 100 and into the aperture 92, which releases the filter element baseplate 100 from the carrier unit 15, as illustrated in FIG. 9 D.

The transfer mechanism 30 is typically, but not always, utilized to load and unload filter element baseplate assemblies 100 from a welder or tapper 31 and a parts washer 2 in a reliable and efficient manner. The transfer mechanism 30 is typically positioned between the welder or tapper 31 and the parts washer 2, as illustrated in FIG. 10. The transfer and/or lift mechanism 34 of the transfer mechanism 30 can position the pivot arm 99 in a desired location adjacent to the welder or tapper 31, which allows the abutment plate 10 or the finger 20 to engage the baseplate assembly 100.

Figure 12:
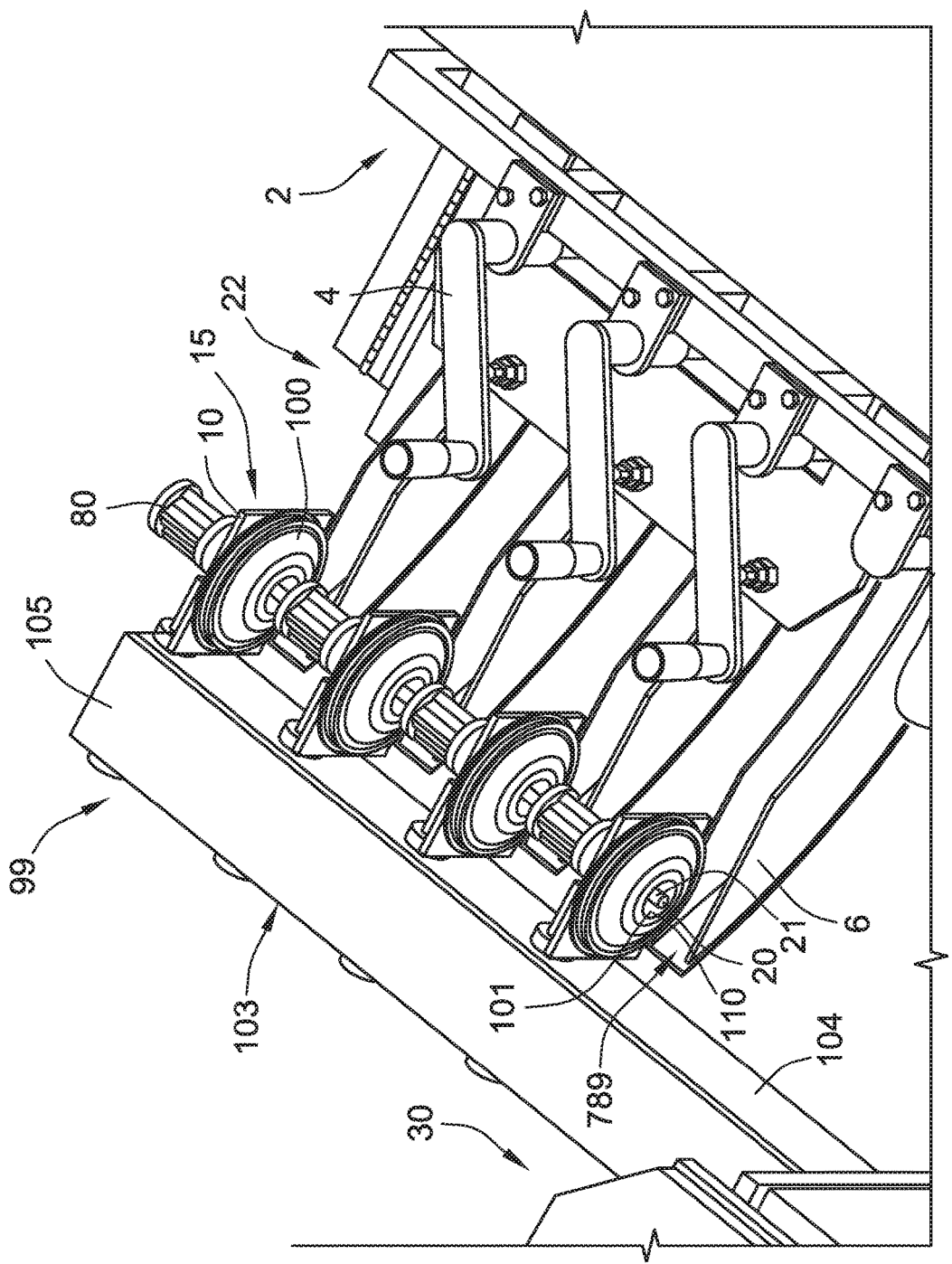
FIG. 12 is a close up partial perspective view of the pivot arm of the transfer mechanism and the inlet area of the parts washer according to an aspect of the invention.

In one embodiment according to the present application, the abutment plate 10 starts in the horizontally extending alignment, as illustrated in FIG. 9 A, and engages the baseplate assembly 100, as illustrated in FIG. 9 B. When the baseplate assembly 100 is positioned on the abutment plate 10, the second linear drive unit 80 can drive the retractable finger 20 through aperture 92 of the abutment plate 10 and through the thread opening 101 of the baseplate assembly 100. Thereby, allowing the contact surface 21 of the finger 20 to secure the baseplate assembly 100 to the carrier unit 15 during transit between the welder or tapper 31 and the parts washer 2. The baseplate assemblies 100 are transported from the welder or tapper 31 to the parts washer 2 by the transfer and/or lift mechanism 34 that can move the pivot arm 99 horizontally and/or vertically to a desired location, such as the inlet area 22 of the parts washer 2, as illustrated in FIG. 12. When the pivot arm 99 is positioned in the desired location by the transfer and/or lift mechanism 34 the carrier unit 15 can rotate 90° to a vertically extending alignment, as illustrated in FIG. 9 C. The baseplate assembly 100 is preferably transported in a horizontally extending alignment, but in an alternative embodiment, the carrier unit 15 can receive the baseplate assembly 100 in a horizontally extending alignment and then rotate to a vertically extending alignment before leaving the welder or tapper 31. If desired, the transfer and/or lift mechanism 34 can move the pivot arm 99 while the carrier unit 15 and base plate assemblies 100 are in a vertically extending alignment.

As illustrated in FIG. 9 D, the finger 20 can release from its extended state to release the baseplate assembly 100 in a vertically extending alignment from the carrier unit 15. The finger 20 will typically release the baseplate assembly 100 from the carrier unit 15 after it arrives at the inlet area 22 of the parts washer 2, as best illustrated in FIG. 12. The inlet area 22 can have a ramp 6 extending from the parts washer 2, as illustrated in FIG. 10-12. The parts washer 2 can have a conveyor 5 that runs from the inlet area 22 to the outlet area 222 of the parts washer, as best illustrated in FIG. 10. The parts washer 2 can have a lane 789 extending from the ramp 6 of inlet area 22 to the outlet area 222 of the parts washer 2. The lane can have first and second sidewalls 8 and 9 that define a slot 7, as best illustrated in FIG. 11-12. As best illustrated in FIG. 11, the cylindrical levers 4 can move the first and second sidewall 8 and 9 relative to each other, thereby increasing or decreasing the width of the slot 7 to accommodate baseplate assemblies 100 of varying axial thicknesses.

The baseplate assembly 100 remains in a vertically extending alignment as it is released from the carrier unit 15 and falls between the first and second sidewalls 8 and 9 into the slot 7 of the ramp 6. The baseplate assembly 100 can then traverse along the slot 7 of the ramp 6 as the first and second sidewalls 8 and 9 keep the baseplate assembly 100 in a vertically extending alignment, as illustrated in FIG. 10. The baseplate assembly 100 can then exit the ramp 6 and enter the conveyor 5 while staying in a vertically extending alignment, as best illustrated in FIG. 10. As the baseplate assembly 100, enters the lane 789 of the conveyor 5 the first and second sidewall 8 and 9 will keep the baseplate assembly 100 in a vertically extending alignment as it moves along the conveyor 5 of the parts washer 2.

As illustrated in FIG. 10, the conveyor 5 can have a catch 3 extending vertically from the conveyor 5. When the conveyor 5 is powered by drive unit 66 the catch 3, extending vertically from the conveyor 5, can engage and drive a baseplate assembly 100, while it remains in a vertically extending alignment, along the parts washer 2. As the baseplate assembly 100 is driven by the catch 3 along the conveyor 5 it can be washed by the parts washer 2 in a vertically extending alignment.

FIGS. 13 A-13 D illustrate another embodiment of a carrier unit 15' according to one aspect of the present application. As will be readily understood by one having ordinary skill in the art the embodiment of the carrier unit 15' illustrated in FIGS. 13 A-13 D can be similarly used with the arm 99 and the transfer and/or lift mechanism 34 described in detail above.

FIG. 13 A illustrates a perspective view of a carrier unit 15' in a horizontally extended position with its fingers 20' in the extended state and ready to receive a baseplate assembly 100. In the illustrated embodiment the carrier unit 15' has four fingers 20' extending from an abutment plate 10' having a first surface 12' and a second surface 14'. Coupled to the second surface 14' of the abutment plate 10' is the second linear drive unit 80'. The fingers 20' have a contact surface 21' for engaging and securing the baseplate assembly 100 that are at the distal end of the fingers 20'.

Figure 14C:
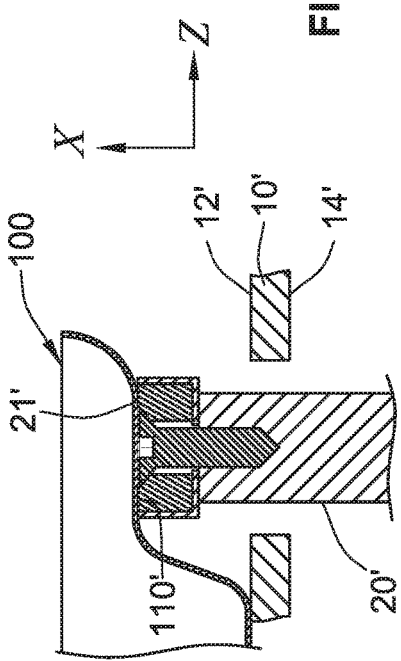
FIG. 14 A is a partial close up cross-sectional view of a baseplate assembly and carrier unit before the baseplate assembly has been engaged and secured by a finger of the carrier unit while the baseplate assembly and the carrier unit are in a horizontally extending alignment.
Figure 14D:
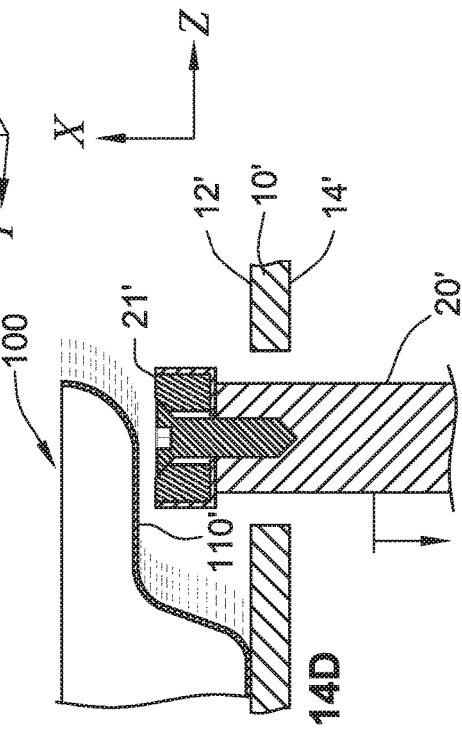

FIG. 14 A is a partial cross sectional view through a finger 20' of the carrier unit 15' illustrated in FIG. 13 A. As illustrated the baseplate 100 is a horizontally extending alignment and the finger 20' as well as the abutment plate 10' of the carrier unit 15' are in a horizontally extending alignment and engage and secure the baseplate assembly 100 in the horizontally extending alignment.

FIG. 13 B illustrates a perspective view of the baseplate assembly 100 engaged and secured to the contact surfaces 21' of the fingers 20'. As will be appreciated by one having ordinary skill in the art the contact surface 21' of the fingers 20' can implement any coupling means or material generally known in the art including, but not limited to, a magnetic material, a pneumatic vacuum or an adhesive material.

FIG. 14 B is a partial cross sectional view through a finger 20' of the carrier unit 15' illustrated in FIG. 13 B. As illustrated the contact surface 21' of the finger 20' and the coupling surface 110 of the baseplate 100 have formed a strong engagement allowing the baseplate assembly 100 to be secured to the carrier unit 15' while in the horizontally extending alignment.

As will be appreciated by those of ordinary skill in the art the composition or securing means picked for a particular contact surface 21' will depend on the type of baseplate assembly 100 being manufactures as well as the specifics of the manufacturing process itself including but not limited to the material composition of the baseplate assembly 100, the chemicals being used in the manufacturing process of the baseplate assembly 100, and the environmental conditions the baseplate assembly 100 is expected to be exposed to during the manufacturing process.

In one preferred embodiment, the contact surface 21' uses magnetic force to provide a secure engagement with the baseplate assemblies 100 because many, but not all, baseplate assemblies 100 are manufactured from a magnetic material. As further will be appreciated by one having ordinary skill in the art, magnets are relatively inexpensive to buy or replace, while also providing a secure yet irreversible engagement to magnetic material.

FIG. 13 C illustrates a perspective view of the carrier unit 15' and the baseplate assembly 100 in a vertically extending state. As will be appreciated by one having ordinary skill in the art, the secure engagement formed between the coupling surface 110 of the baseplate assembly 100 and the contact surface 21' of the finger 20' acts to secure the baseplate assembly 100 to the carrier unit 15' while both the carrier unit 15' and the baseplate assembly 100 are in the vertically extending alignment.

FIG. 14 C is a partial cross sectional view through a finger 20' of the carrier unit 15' of FIG. 13 C. As illustrated the contact surface 21' of the finger 20' and the coupling surface 110 of the baseplate 100 have formed a strong engagement allowing the baseplate assembly 100 to be secured to the carrier unit 15' while in the vertically extending alignment.

FIG. 13 D illustrates a perspective view of the baseplate assembly 100 being released from the carrier unit 15' while both the carrier unit 15' and the baseplate assembly 100 are in the vertically extending alignment. Further illustrated are the contact surfaces 21' of the fingers 20' that are no longer projecting through apertures 92' of the abutment plate 10'.

As will be appreciated by one having ordinary skill in the art when the contact surfaces 21' are retracted such that they no longer are projecting beyond the first surface 12' of the abutment plate 10' the baseplate assembly 100 will be released from the carrier unit 15' because the baseplate assembly 100 will make contact with the first surface 12' of the abutment plate 10' as the contact surface 21' passes beyond the first surface 12' of the abutment plate 10'. This contact between the baseplate assembly 100 and the first surface 12' of the abutment plate 10' acts to break the secure engagement between the coupling surface 110 of the baseplate assembly 100 and the contact surfaces 21' of the finger 20', which then releases the baseplate assembly 100 from the carrier unit 15'.

FIG. 14 D is a partial cross sectional view through a finger 20' of the carrier unit 15' of FIG. 13 D. As illustrated the baseplate assembly 100 has made contact with the first surface 12' of the abutment plate 10', which has broken the secure engagement between the coupling surface 110 of the baseplate assembly 100 and the contact surface 21' of the finger 20, which thereby releases the baseplate assembly 100 from the carrier unit 15'.

Further illustrated in FIG. 14. D is the principle that the fingers 20' are not required to retract entirely into the aperture 92' of the abutment plate 10' to releases the baseplate assembly 100 from the carrier unit 15'. As will be understood by those having ordinary skill in the art, when it is time to release the baseplate assembly 100 the finger 20' is only required to retract far enough into the aperture 92' of the abutment plate 10' so that the baseplate assembly 100 makes contact with the first surface 12' of the abutment plate 10'. Therefore, the finger 20' may only need to be partially retracted into the aperture 92' of the abutment plate 10', as illustrated in FIG. 14 D, in order for the baseplate 100 to make contact with the first surface 12' of the abutment plate 10', which in turn acts to break the secure engagement between the coupling surface 110 of the baseplate assembly 100 and the contact surface 21' of the finger 20, thereby releasing the baseplate assembly 100 from the carrier unit 15'.

Figure 15:
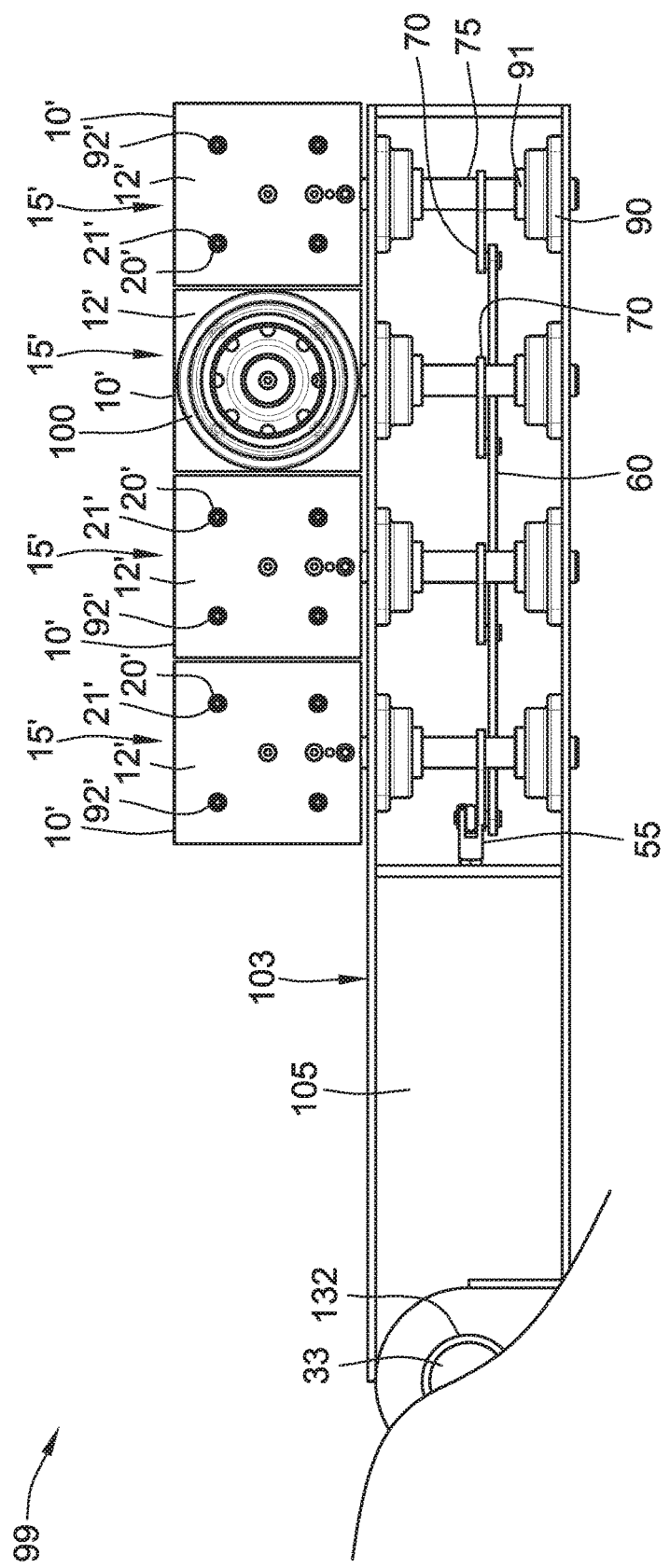
FIG. 15 illustrates a top-down partial perspective view of one embodiment of the pivot arm according to an aspect of the application with one embodiment of a carrier unit, abutment plate, and finger in a vertically extending alignment with the finger in an extended state relative to the abutment plate and one of the carrier units in the horizontally extending state carrying a baseplate assembly.

FIG. 15 illustrates a top down view of the carrier unit 15' coupled with an arm 99 of one embodiment of a transfer apparatus. The carrier units 15' are in their horizontally extending state with the fingers 20' projecting beyond the first surface 12' of the abutment plate 10'. As illustrated one of the carrier units 15' is shown with a baseplate 100 assembly secured to the carrier unit 15'.

Figure 16:
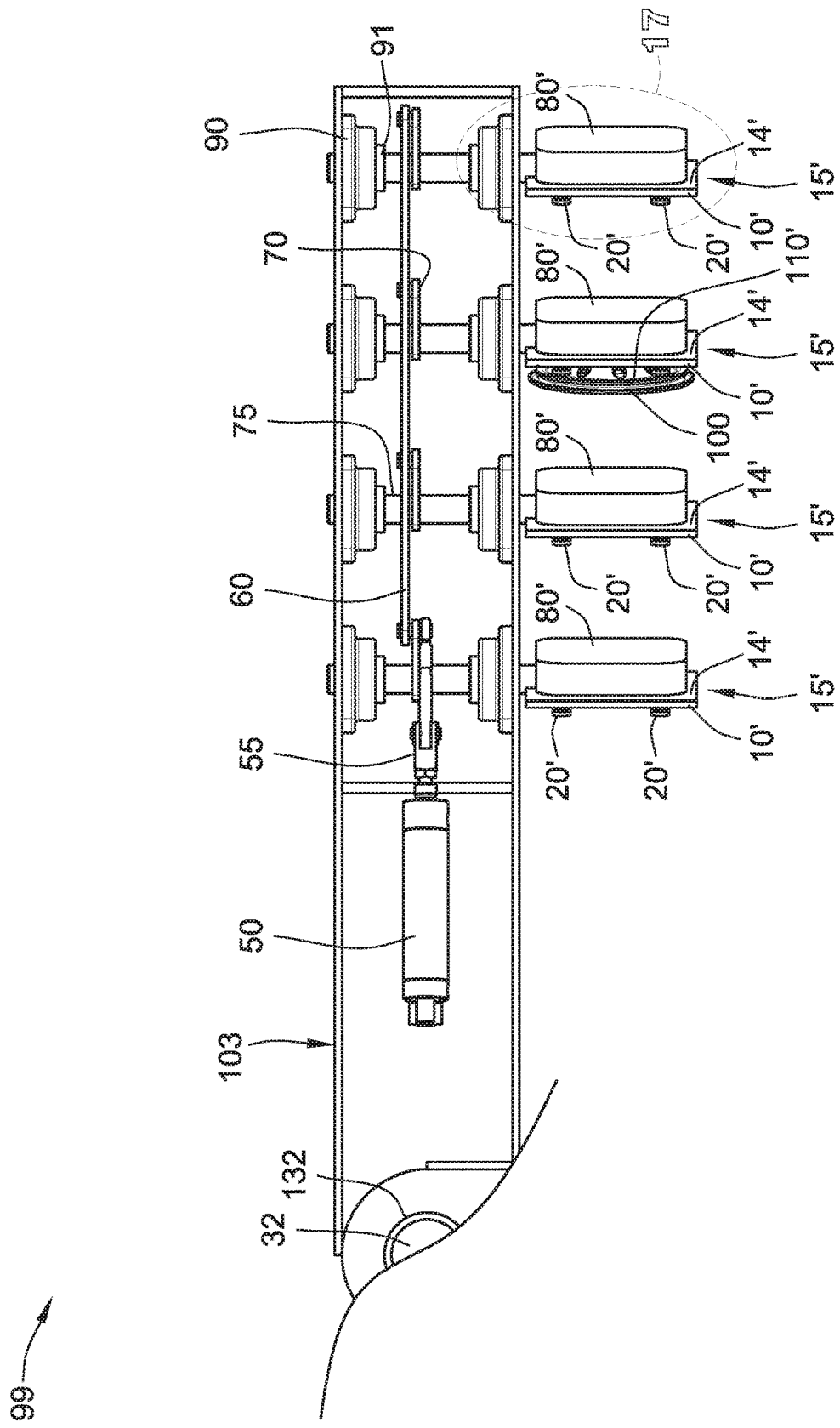
FIG. 16 illustrates a bottom-up partial perspective view of one embodiment of a pivot arm according to one aspect of the application illustrating one embodiment of a carrier unit, abutment plate, and finger in a horizontally extending alignment with the finger is in an extended state relative to the abutment plate according to one aspect of the application.

FIG. 16 illustrates the arm 99 and carrier unit 15' illustrated in FIG. 15 with the exception that the carrier unit 15' is securing the baseplate assembly 100 while both the carrier unit 15' and the baseplate assembly 100 are in a vertically extending alignment. As illustrated the fingers 20' of the carrier units 15' are in their extended state. Further illustrated is a carrier unit 15' securing a baseplate assembly 100 while in the vertically extending alignment. As illustrated, the finger 20' of the carrier unit 15' has formed a strong and secure engagement with a coupling surface 110 (see FIGS. 14B-14D) of the baseplate assembly 100 thereby securing the baseplate assembly 100 to the carrier unit 15' even while the carrier unit 15' and the baseplate assembly 100 are in the vertically extending alignment.

Figure 17:
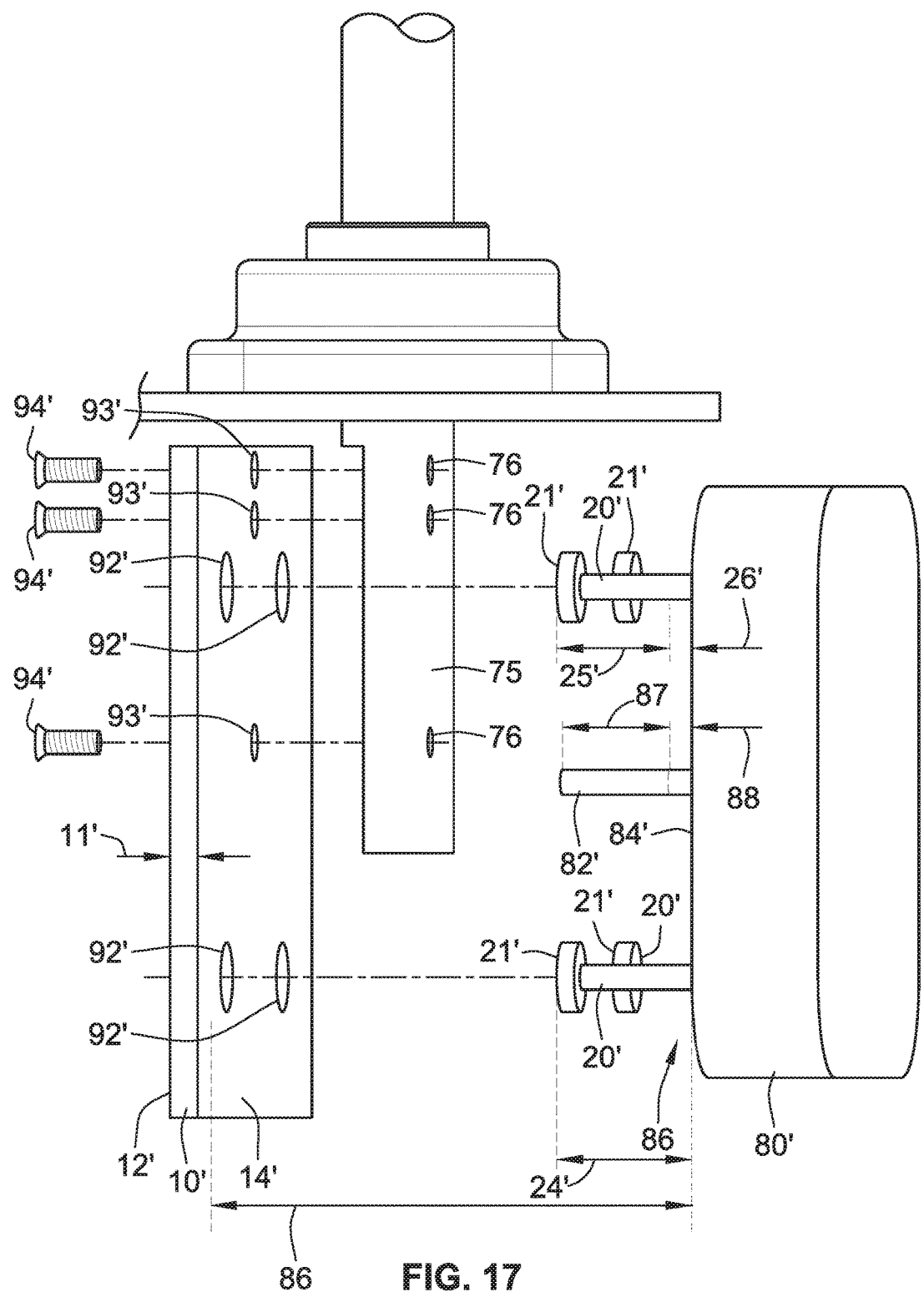
FIG. 17 is an exploded perspective view of a carrier unit of FIG. 16 illustrating the rod housed within the second linear drive unit that is used to drive the second linear drive unit and fingers in a linear direction away from the second surface of the abutment plate.

FIG. 17 illustrates an exploded perspective view of the carrier unit 15' illustrated in FIG. 16. As illustrated, the carrier unit 15' is coupled to the shaft 75 of the arm 99 by couplers 94' that extend through apertures 93' of the abutment plate 10' and apertures 76 of the shaft 75. The rotation of the shaft 75 can then act to rotate the carrier unit 15' between the horizontally extending alignment and the vertically extending alignment. The carrier unit 15' has fingers 20' that are mechanically coupled to a top surface 84' of the second linear drive unit 80'. The carrier unit 15' also has an abutment plate 10' having apertures 92', which allows the fingers 20' to move from the retracted state to the extended state relative to the abutment plate 10'.

In use, the fingers 20' will enter their extended state relative to the abutment plate 10' when the contact surfaces 21' of the fingers 20' are projecting through the apertures 92', such that the contact surfaces 21' can receive a baseplate assembly 100 without interference from the first surface 12' of the abutment plate 10'. As will be understood by one having ordinary skill in the art the linear distance that the fingers 20' must project beyond to the first surface 12' of the abutment plate 10' to reach their extended state will depend on a number of factors such as, but not limited to the number of fingers 20' being implemented in a particular embodiment or the size and curvature of the particular baseplate assembly 100 being manufactured. Therefore, as will also be understood by one having ordinary skill in the art the fingers 20' can enter the extended state at any time that the contact surfaces 21' of the fingers 20' have cleared the first surface 12' of the abutment plate 10' and are capable of engaging and securing a coupling surface 110 of a baseplate assembly 100.

The second linear drive unit 80' has an actuation rod 82'. The distal end of the rod 82' is mechanically coupled to the second surface 14' of the abutment plate 10'. The rod 82' has a retracted state where at least a portion of the rod 82' is housed within the second linear drive unit 80' and an extended state where at least a portion of the rod 82' is housed within the second linear drive unit 80'.

In use, as the rod 82' is in the retracted state the second carrier unit 80' will be located a linear distance 14' that is close enough to the abutment plate 10' that the fingers 20' are at least partially projecting through the apertures 92' of the abutment plate 10', such that the contact surfaces 21' of the fingers 20' are capable of engaging and securing a coupling surface 110' of a baseplate assembly 100 without interference from the first surface 12' of the abutment plate 10'.

When it is time to release the baseplate assembly 100 from the carrier unit 15' the rod 82' will be actuated by the second linear drive unit 80'. The actuation of the rod 82' creates a linear force on the second linear drive unit 80' that is in a linear direction away from the second surface 14' of the abutment plate 10'. As the distal end of the rod 82' is coupled to the second surface 14' of the abutment plate 10' the linear force created on the second linear drive unit 80' acts to shift the second linear drive unit 80' in a linear direction 86 that is away from the second surface 14' of the abutment plate 10'.

As will be appreciated by those having ordinary skill in the art as the rod 82' shifts the second linear drive unit 80' in a linear distance 14' away from the second surface 14' of the abutment plate 10' it also will shift the fingers 20' in a linear direction towards the first surface 12' of the abutment plate 10' because, as stated above, the fingers 20' are mechanically coupled to the top surface 84' of the second linear drive unit 80'.

Thus, as will be readily understood by one having ordinary skill in the art when the rod 82' is housed within the second linear drive unit 80' and is in its fully retracted state the fingers 20' will be in their fully extended state. Likewise, when the rod 82' is actuated by the second linear drive unit 80' such that the rod 82' enters its fully extended state the fingers 20' will be in their fully retracted state. Therefore, as will be appreciated by one of ordinary skill in the art according to one embodiment of the present application the second linear drive unit 80' can control the movement of the fingers 20' from their retracted state to their extended state relative to the abutment plate 10' via the actuation of the rod 82' from its extended state to its retracted state.

However, as one of ordinary skill in the art will readily appreciate any means generally known in the art can be used to create the relative motion between the finger 20' and the abutment plate 10' and the creation of the relative motion between the finger 20' and the abutment plate 10' is not meant to be limited to the use of the rod 82' coupled between the second linear drive unit 80' and the second surface 14' of the abutment plate 10'. Indeed, any means of relative motion may be used to move the finger 20' from an extended state to a retracted state relative to the abutment plate 10'.

As will also be understood by one having ordinary skill the actuation of the rod 82' by the second linear drive unit 80' from a retracted state to an extended state controls the movement of the finger 20' from the extended state to the retracted state relative to the abutment plate 10', such that the stroke 87 of the rod 82' and the length 24' of the fingers 20' will need to correspond to one another in order to ensure that when the rod 82' is in its retracted state that the fingers 20' have a length 24' which allows them to enter an extended state relative to the abutment plate 10', such that the contact surfaces 21' of the fingers 20' can make a secure engagement with the coupling surface 110' of a baseplate assembly 100.

Further, as will also be appreciated by one having ordinary skill in the art when the length 24' of the finger 20' is being considered the thickness 11' of the abutment plate 10' must also be taken into consideration. For example, when considering the total length 24' of the finger 20' one will need to contemplate a clearance length 25' of the finger 20', which is the portion of the finger 20' that will project through the apertures 92' of the abutment plate 10, as well as a non-clearance length 26' of the finger 20', which is the portion of the finger 20' that will not extend through the apertures 92' when the finger 20' is in its extended state relative to the abutment plate 10'.

Likewise, when considering the stroke 87 of the rod 82' one will need to considered any non-stroke 88 portion of the rod 82', such as any portion of the rod 82' that remains projecting from the second linear drive unit 80' while rod 82' is in the retracted state, such as if a portion of the rod 82' is required to remain projecting from the second linear drive unit 80' while the rod 82' is in the retracted state in order for the rod 82' to be coupled to the abutment plate 10'.

Next, the carrier plate 15' can be implemented into a baseplate assembly transfer mechanism 1 to transfer baseplate assemblies between a welder and/or tapper 31 to a parts washer 2. The abutment plate 10 and the finger 20' of the carrier unit 15' will typically begin in the horizontally extending alignment, as illustrated in FIG. 13 A.

The contact surfaces 21' of the finger 20' then engage and secure the coupling surface of the baseplate assembly 100 while the carrier unit 15' remains in the horizontally extending alignment, as illustrated in FIG. 13 B. With the baseplate assembly 100 engaged and secured to the finger 20' the baseplate assembly 100 can be safely transferred between the welder or tapper 31 and the parts washer 2.

As discussed above, the baseplate assemblies 100 are transported from the welder or tapper 31 to the parts washer 2 by the transfer and/or lift mechanism 34 that can move the pivot arm 99 horizontally and/or vertically to a desired location, such as the inlet area 22 of the parts washer 2. When the pivot arm 99 is positioned in the desired location by the transfer and/or lift mechanism 34 the carrier unit 15' can rotate 90° moving the abutment plate 10, finger 20', and baseplate assembly 100 into a vertically extending alignment, as illustrated in FIG. 13 C.

The baseplate assembly 100 is preferably transported in a horizontally extending alignment, but in an alternative embodiment, the finger 20' can receive the baseplate assembly 100 in a horizontally extending alignment and then the carrier unit 15' can rotate, along with the abutment plate 10', finger 20', and baseplate assembly 100 to a vertically extending alignment before leaving the welder or tapper 31.

If desired, the transfer and/or lift mechanism 34 can move the pivot arm 99 while the carrier unit 15' including the abutment plate 10', finger 20', and the base plate assemblies 100, which are engaged and secured to the contact surface 21' of the finger 20', are in a vertically extending alignment.

After the transfer and/or lift mechanism 34 and arm 99 position the baseplate 100 in the desired position for it to be released from the carrier unit 15' the second linear drive unit 80' actuates the rod 82' to create a linear force against the second surface 14' of the abutment plate 10'. The linear force created by the actuation of the rod 82' drives the linear drive unit 80' away from the second surface 14' of the abutment plate 10'.

As will be understood by one having ordinary skill in the art the rod 82' has a stroke 87 that determines the linear distance that the second linear drive unit 80' will shift relative to the second surface 14' of the abutment plate 10'.

As the linear drive unit 80' moves in a linear direction away from the second surface 14' of the abutment plate 10' it causes the finger 20', which are mechanically coupled to the top surface 84' of the linear drive unit 80', to move in a linear direction towards the first surface 12' of the abutment plate 10'. As the finger 20' moves towards the first surface 12' of the abutment plate 10' the baseplate assembly 100, which the finger 20' still has secured to the carrier unit 15' via the fingers 20' contact surface 21', is also driven in a linear direction towards the first surface 12' of the abutment plate 10'.

When the finger 20' has reached a predetermined linear distance from the first surface 12' of the abutment plate 10' the baseplate assembly 100 will contact the first surface 12' of the abutment plate 10', as illustrated in FIG. 14 C.

As will be understood by one having ordinary skill in the art the predetermined linear distance the finger 20' will reach before the baseplate assembly 100 makes contact with the first surface 12' of the abutment plate 10' will depend on a number of factors such as, but not limited to the thickness of the baseplate assembly 100 being manufactured, the curvature, if any, of the baseplate assembly 100 being manufactured, or the positioning of the finger 20' or fingers 20' securing the baseplate assembly 100.

As will also be understood by one having ordinary skill in the art the stroke 87 of the rod 82' determines the linear distance that the finger 20' can project through the apertures 92' of the abutment plate 10' while in the extended state and the linear distance that the finger 20' can be retracted into and/or through the aperture 92' of the abutment plate 10' while in the retracted state because the fingers 20' are mechanically coupled to the top surface 84' of the second linear drive unit 80' and the stroke 87 of the rod 82' determines the linear distance the second linear drive unit 80' is capable of shifting in a linear direction away from the second surface 14' of the abutment plate 10' as well as the linear distance that the second linear drive unit 80' is capable of shifting toward the second surface 14' of the abutment plate 10'.

The contact between baseplate assembly 100 and the first surface 12' of the abutment plate 10' will create a linear force on the baseplate assembly 100 that is opposite the direction of the first surface 12' of the abutment plate 10'. As illustrated in FIG. 13 D the secure engagement between the contact surface 21' of the finger 20' and the coupling surface 110' of the baseplate assembly 100 is broken by the linear force created by the baseplate assembly 100 contacting the first surface 12' of the abutment plate 10', thereby, releasing the baseplate assembly 100 from the carrier unit 15'.

As will be understood by one having ordinary skill in the art when selecting the coupling means to form a secure engagement between the contact surface 21' of the finger 20' and the coupling surface 110 of the baseplate 110 the user will need to select a coupling means that provides a secure engagement between the contact surface 21' and the coupling surface 110 of the baseplate 100 such as to ensure that the baseplate assembly 100 remains securely engaged to the carrier unit 15' during the transport of the baseplate assembly 100, while at the same time taking into consideration that in order for the baseplate assembly 100 to be released from the carrier unit 15' the secure engagement between the contact surface 21' of the finger 20' and the coupling surface 110' of the baseplate assembly 100 will need to be broken by the linear force created by the baseplate assembly 100 making contact with the first surface 12' of the abutment plate 10'.

In one typical application according to one aspect of the present application the baseplate assembly 100 will be released from the carrier unit 15' after the transfer/lift mechanism 34 has transported the baseplate assembly 100 to the inlet area 22 of the parts washer 2 and the arm 99 has positioned the baseplate assembly 100 at the inlet area 22 of the parts washer 2.

For the sake of redundancy once the carrier unit 15' releases the baseplate assemblies 100 at the inlet area 22 of the parts washer 2 and the baseplate assemblies 100 are received in a vertically extending alignment into the lanes 789 of the parts washer 2 the parts washer 2 will then proceed to process and wash the baseplate assemblies 100 released by the carrier unit 15' as previously described in detail above.

Once the carrier unit 15' has released the baseplate assembly 100 into the inlet area 22 the carrier units 15' can be transported back to the welder and/or tapper 31 by the transfer/lift mechanism 34 and the arm 99. Once back at the welder and/or tapper 31 the carrier units 15' will return to their starting positions and receive a new set of baseplate assemblies 100 from the welder and/or tapper 31 where the entire process will begin again.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for processing a filter element baseplate assembly, comprising:
 a transfer mechanism comprising a carrier unit rotatable between a horizontally extending alignment and a vertically extending alignment;
 a finger projecting through an abutment plate in an extended state relative to the abutment plate and holding the filter element baseplate assembly to the carrier unit in each of the horizontally and vertically extending alignments, the finger having a retracted state relative to the abutment plate that releases the filter element baseplate assembly from the carrier unit.

2. The apparatus of claim 1, wherein the transfer mechanism picks the filter element baseplate assembly from a welder or tapper in the horizontal position and deposits the filter element base plate assembly in a parts washer.

3. The apparatus of claim 2, wherein the parts washer includes a lane defined by a first and a second sidewall;
wherein the first and second sidewall define a slot;
the slot having a horizontal width therebetween that is greater than the axial thickness of the filter element baseplate assembly such that the filter element baseplate assembly is maintained in the slot in a vertically extending alignment;
wherein the diameter of the filter element baseplate assembly is vertically extending.

4. The apparatus of claim 2, wherein the parts washer has a conveyor extending longitudinally from an inlet to an outlet of the parts washer;
wherein the parts washer has a lane extending longitudinally along the parts washer;
wherein the lane comprises a slot and a first and a second sidewall;
wherein the conveyor has a catch;
wherein the catch extends vertically from the conveyor;
wherein the catch engages and drives the filter element baseplate assemblies along the lane of the parts washer, while the filter element baseplate assemblies remain in a vertically extending alignment.

5. The apparatus of claim 2, wherein the filter element baseplate assembly includes a plurality of apertures to provide for an inlet port and an outlet port through the filter element baseplate assembly, including a thread opening and a plurality of apertures surrounding the thread opening;
wherein the finger projects through the thread opening when the filter element baseplate assembly is in the vertically extending alignment or the horizontally extending alignment.

6. The apparatus of claim 1, wherein the transfer mechanism has a pivot arm carrying the carrier unit;
wherein the pivot arm is mounted to a work transfer and/or lift mechanism.

7. The apparatus of claim 1, further comprising a first linear drive unit;
wherein the first linear drive unit is coupled to a pushrod;
wherein the pushrod is coupled to a rocker;
wherein the rocker is coupled to a shaft;
wherein the shaft is coupled to the carrier unit;
wherein movement of the first linear drive unit is operative to rotate the carrier unit.

8. The apparatus of claim 1, wherein the apparatus further comprising a second linear drive unit mounted to the abutment plate;
wherein the second linear drive unit drives the finger between an extended state and a retracted state relative to the abutment plate.

9. The apparatus for processing the filter element baseplate assembly of claim 1 comprising a parts washer having an inlet area and an outlet are;
the parts washer further comprising a longitudinally extending conveyor between the inlet area and the outlet area;
the conveyor having a catch extending vertically from the conveyor;
the parts washer further comprising a lane to receive and guide the filter element baseplate assembly;
wherein the lane comprises a ramp for receiving the filter element baseplate assembly in a vertically extending alignment;
the lane further comprising a slot longitudinally extending from the ramp of the inlet area of the parts washer to the outlet area of the parts washer;
the lane further comprising a first and a second sidewall defining the slot;
the slot having a horizontal width therebetween that is greater than the axial thickness of the filter element baseplate assembly, such that the filter element baseplate assembly is maintained in the slot in the vertically extending alignment.

10. The apparatus of claim 9, wherein the first and the second sidewall are moveable relative to each other to adjust the horizontal width of the slot to facilitate the movement of the filter element baseplate assembly in the vertically extending alignment.

11. The apparatus of claim 9, wherein a multitude of catches are extending vertically from the conveyor to engage and drive the filter element baseplate assemblies along the conveyor in the vertically extending alignment.

12. A method of transferring a filter element baseplate assembly from a welder or tapper to a parts washer with the transfer mechanism of claim 1, comprising:
receiving the filter element baseplate assembly on the carrier unit in a horizontally extending alignment;
extending the finger to an extended state relative to the abutment plate;
the finger engaging and securing the filter element baseplate to the carrier unit; and transferring the filter element baseplate assembly on the carrier unit from the welder or tapper to the parts washer, wherein the finger in the extended state secures the filter element baseplate assembly.

13. The method of claim 12, further comprising:
rotating the carrier unit and the filter element baseplate assembly between the horizontally extending alignment and a vertically extending alignment.

14. The method of claim 12, further comprising:
retaining the filter element baseplate assembly on the carrier unit in the vertically extending alignment with the finger.

15. The method of claim 12, further comprising:
retracting the finger to the retracted state relative to the abutment plate to release the filter element baseplate assembly from the carrier unit where the filter element baseplate assembly drops into a lane of the parts washer.

16. The method of claim 15, further comprising:
guiding the filter element baseplate assembly down a ramp of the lane into a slot of the lane where the filter element baseplate assembly is kept in the vertically extending alignment by a first and second sidewall defining the lane and the slot having a horizontal width therebetween that is greater than the axial thickness of the filter element baseplate assembly such that the filter element baseplate assembly is maintained in the lane in the vertically extending alignment wherein the diameter of the filter element baseplate assembly is vertically extending.

17. The method of claim 15, further comprising:
powering a conveyor drive unit to drive a conveyor on the parts washer, wherein a catch extending vertical from the conveyor engages and drives the filter element baseplate assembly in a linear direction along the lane, wherein the first and second sidewall of the lane guide the filter element baseplate assembly along the conveyor in the vertically extending alignment.

18. The method of claim 15, further comprising:
washing the filter element baseplate assembly as the filter element baseplate assembly is driven along the lane of a conveyor while the filter element baseplate is in a vertically extending alignment.

19. A method of use for the apparatus of claim 1, comprising:
receiving a filter element baseplate assembly on a carrier unit in a horizontally extending alignment;
extending a finger through an aperture of the carrier plate and through a thread opening in the filter element baseplate assembly;
transferring the filter element baseplate assembly on the carrier unit from a welder or tapper to a parts washer wherein the finger extending through the thread opening secures the filter element baseplate assembly;
rotating the carrier unit and the filter element baseplate assembly between the horizontally extending alignment and a vertically extending alignment;
retaining the filter element baseplate assembly on the carrier unit in the vertically extending alignment with the finger extending through the thread opening of the filter element baseplate assembly; and
retracting the finger relative to the abutment plate to release the filter element baseplate assembly from the carrier unit where the filter element baseplate assembly drops into a lane of the parts washer.

20. A method of use for the apparatus of claim 9, comprising:
guiding a filter element baseplate assembly down a ramp in a slot of a lane of a parts washer;
keeping the filter element baseplate assembly in a vertically extending alignment by a first and a second sidewall defining the slot where the slot has a horizontal width therebetween that is greater than the axial thickness of the filter element baseplate assembly, such that the filter element baseplate assembly is maintained in the lane in the vertically extending alignment wherein the diameter of the filter element baseplate assembly is in the vertically extending alignment;
powering a conveyor drive unit of the parts washer to drive a conveyor having a catch extending vertically from the conveyor of the parts washer;
engaging and driving the filter element baseplate assembly in a linear direction along the lane with the catch;
guiding the filter element baseplate assembly along the conveyor in the vertically extending alignment with the first and the second sidewall of the lane; and
washing the filter element baseplate assembly while the catch drives the filter element baseplate assembly down the line of the conveyor and the first and the second sidewall keep the filter element baseplate assembly in the vertically extending alignment.

21. An apparatus for processing a filter element baseplate assembly, comprising:
a transfer mechanism comprising a carrier unit rotatable between a horizontally extending alignment and a vertically extending alignment;
wherein the carrier unit has a finger and an abutment plate;
wherein the finger has an extended state through the abutment plate;
wherein the finger has a contact surface that secures the filter element baseplate assembly to the carrier unit in each of the horizontally and vertically extending alignments; and
wherein the finger has a retracted state relative to the abutment plate that releases the filter element baseplate assembly from the carrier unit.

22. The apparatus of claim 21, wherein the transfer mechanism picks the filter element baseplate assembly from a welder or tapper in the horizontal position and deposits the filter element base plate assembly in a parts washer.

23. The apparatus of claim 21, wherein the parts washer includes a lane defined by a first and a second sidewall;
wherein the first and second sidewall define a slot;
the slot having a horizontal width therebetween that is greater than the axial thickness of the filter element baseplate assembly such that the filter element baseplate assembly is maintained in the slot in a vertically extending alignment;
wherein the diameter of the filter element baseplate assembly is vertically extending.

24. The apparatus of claim 22, wherein the parts washer has a conveyor extending longitudinally from an inlet to an outlet of the parts washer;
wherein the parts washer has a lane extending longitudinally along the parts washer;
wherein the lane comprises a slot and a first and a second sidewall;
wherein the conveyor has a catch;
wherein the catch extends vertically from the conveyor;
wherein the catch engages and drives the filter element baseplate assemblies along the lane of the parts washer, while the filter element baseplate assemblies remain in a vertically extending alignment.

25. The apparatus of claim 21, wherein the contact surface is a magnet, pneumatic vacuum, or adhesive.

26. The apparatus of claim 21, wherein the transfer mechanism has a pivot arm carrying the carrier unit;
wherein the pivot arm is mounted to a work transfer and/or lift mechanism.

27. The apparatus of claim 26, further comprising a first linear drive unit;
wherein the first linear drive unit is coupled to a pushrod;
wherein the pushrod is coupled to a rocker;
wherein the rocker is coupled to a shaft;
wherein the shaft is coupled to the carrier unit;
wherein movement of the first linear drive unit is operative to rotate the carrier unit.

28. The apparatus of claim 27, wherein the apparatus further comprises a second linear drive unit;
wherein the second linear drive unit has a rod mechanically coupled to the abutment plate that when actuated moves the finger from the extended state to the retracted state.

29. A method of use for the apparatus of claim 21, comprising:
positioning a carrier unit in a horizontally extending alignment;
receiving a filter element baseplate assembly on a contact surface of a finger while the finger is in an extended state relative to an abutment plate;
transferring the filter element baseplate assembly on the carrier unit from a welder or tapper to a parts washer while the contact surface of the finger secures the filter element baseplate assembly to the carrier unit;
rotating the carrier unit and the filter element baseplate assembly between the horizontally extending alignment and a vertically extending alignment;
retaining the filter element baseplate assembly on the carrier unit in the vertically extending alignment with the contact surface of the finger; and retracting the finger to a retracted state relative to the abutment plate to release the filter element baseplate assembly from the carrier unit where the filter element baseplate assembly drops into a lane of the parts washer.

* * * * *